(12) United States Patent
Xu et al.

(10) Patent No.: US 11,153,869 B2
(45) Date of Patent: Oct. 19, 2021

(54) TECHNIQUES FOR CONFIGURING AN ADAPTIVE FRAME STRUCTURE FOR WIRELESS COMMUNICATIONS USING UNLICENSED RADIO FREQUENCY SPECTRUM

(71) Applicant: QUALCOMM Incorporated, San Diego, CA (US)

(72) Inventors: Hao Xu, Beijing (CN); Peter Gaal, San Diego, CA (US); Wanshi Chen, San Diego, CA (US); Tingfang Ji, San Diego, CA (US); Durga Prasad Malladi, San Diego, CA (US); Yongbin Wei, La Jolla, CA (US); Naga Bhushan, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 15/889,454

(22) Filed: Feb. 6, 2018

(65) Prior Publication Data
US 2018/0167942 A1 Jun. 14, 2018

Related U.S. Application Data

(63) Continuation of application No. 14/494,779, filed on Sep. 24, 2014, now Pat. No. 9,924,509.
(Continued)

(51) Int. Cl.
*H04W 72/04* (2009.01)
*H04W 28/18* (2009.01)
(Continued)

(52) U.S. Cl.
CPC ......... *H04W 72/0446* (2013.01); *H04L 5/003* (2013.01); *H04W 28/18* (2013.01);
(Continued)

(58) Field of Classification Search
CPC .. H04L 5/003; H04W 28/18; H04W 72/0446; H04W 72/0413; H04W 72/1268; H04W 72/1289
See application file for complete search history.

(56) References Cited

U.S. PATENT DOCUMENTS

| 8,374,212 | B2 * | 2/2013 | Charbit | ............... | H04W 72/082 375/132 |
| 8,634,333 | B2 | 1/2014 | Sarkar | | |

(Continued)

FOREIGN PATENT DOCUMENTS

| JP | 2008535392 A | 8/2008 |
| JP | 2011188451 A | 9/2011 |

(Continued)

OTHER PUBLICATIONS

International Search Report and Written Opinion—PCT/US2014/057340—ISA/EPO—dated Jan. 28, 2015.
(Continued)

*Primary Examiner* — Redentor Pasia
(74) *Attorney, Agent, or Firm* — Patterson & Sheridan, L.L.P

(57) ABSTRACT

Certain aspects of the present disclosure relate to techniques for configuring an adaptive frame structure for wireless communications systems using unlicensed radio frequency spectrum. A base station (BS) may determine whether another device is transmitting on a channel in the unlicensed radio frequency spectrum or one or more other network conditions pertaining to the channel, determine a frame structure from a plurality of frame structures used for data (Continued)

communications based at least in part on the one or more network conditions, wherein each of the plurality of frame structures has a different frame duration, and communicate with a user equipment (UE) using the determined frame structure. A UE may determine a frame structure from a plurality of frame structures used for data communications, wherein each of the plurality of frame structures has a different frame duration, and communicate with a BS using the determined frame structure.

16 Claims, 21 Drawing Sheets

Related U.S. Application Data

(60) Provisional application No. 61/883,958, filed on Sep. 27, 2013.

(51) Int. Cl.
*H04W 72/12* (2009.01)
*H04L 5/00* (2006.01)

(52) U.S. Cl.
CPC ... *H04W 72/0413* (2013.01); *H04W 72/1268* (2013.01); *H04W 72/1289* (2013.01)

(56) References Cited

U.S. PATENT DOCUMENTS

| | | | |
|---|---|---|---|
| 2005/0026639 A1 | 2/2005 | Lewis | |
| 2010/0008338 A1 | 1/2010 | Tsfati et al. | |
| 2011/0216733 A1* | 9/2011 | Han | H04L 5/003 370/329 |
| 2011/0255570 A1 | 10/2011 | Fujiwara | |
| 2012/0039183 A1* | 2/2012 | Barbieri | H04W 16/14 370/241.1 |
| 2012/0039284 A1* | 2/2012 | Barbieri | H04W 48/10 370/329 |
| 2012/0094681 A1 | 4/2012 | Freda et al. | |
| 2012/0128043 A1 | 5/2012 | Hong et al. | |
| 2013/0083710 A1 | 4/2013 | Chen et al. | |
| 2013/0195073 A1 | 8/2013 | Chen et al. | |
| 2013/0203458 A1 | 8/2013 | Charbit et al. | |
| 2013/0208587 A1 | 8/2013 | Bala et al. | |
| 2013/0343241 A1* | 12/2013 | Niu | H04L 1/0041 370/280 |
| 2014/0036853 A1* | 2/2014 | Kim | H04L 5/0053 370/329 |
| 2014/0044105 A1 | 2/2014 | Bontu et al. | |
| 2014/0161002 A1* | 6/2014 | Gauvreau | H04L 5/06 370/280 |
| 2014/0204854 A1* | 7/2014 | Freda | H04W 72/042 370/329 |
| 2014/0313948 A1 | 10/2014 | Jänis et al. | |
| 2014/0314048 A1* | 10/2014 | Yi | H04W 4/70 370/332 |
| 2015/0092703 A1 | 4/2015 | Xu et al. | |
| 2015/0163805 A1* | 6/2015 | Cattoni | H04W 74/006 370/329 |
| 2016/0066322 A1* | 3/2016 | Bontu | H04W 16/14 370/329 |

FOREIGN PATENT DOCUMENTS

| | | |
|---|---|---|
| JP | 2013005322 A | 1/2013 |
| JP | 2013112372 A | 6/2013 |
| WO | WO-2009137646 A2 | 11/2009 |
| WO | WO-2012093289 A1 | 7/2012 |
| WO | WO-2012109195 A2 | 8/2012 |
| WO | WO-2012144801 A3 | 1/2013 |
| WO | WO-2013112372 A1 | 8/2013 |
| WO | 2013167557 A1 | 11/2013 |

OTHER PUBLICATIONS

Sangam P., Qualcomm: "Carrier Aggregation: Can 1+1> 2?" Sep. 23, 2013, 3 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

TECHNIQUES FOR CONFIGURING AN ADAPTIVE FRAME STRUCTURE FOR WIRELESS COMMUNICATIONS USING UNLICENSED RADIO FREQUENCY SPECTRUM

CROSS-REFERENCE TO RELATED APPLICATIONS

The present Application for Patent is a continuation of U.S. patent application Ser. No. 14/494,779, filed Sep. 24, 2014, pending, which claims priority to U.S. Provisional Application No. 61/883,958, filed Sep. 27, 2013, both of which are assigned to the assignee hereof and hereby expressly incorporated by reference herein.

BACKGROUND

Field of the Disclosure

The present disclosure relates generally to wireless communication, and more particularly, to techniques for configuring adaptive frame structures for wireless communications using unlicensed radio frequency spectrum.

Description of the Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

As the demand for mobile broadband access continues to increase, using LTE in unlicensed radio frequency spectrum has been considered to solve the spectrum congestion problem for future wireless needs, not only to meet the growing demand for mobile broadband access, but to advance and enhance the user experience with mobile communications. However, unlicensed radio frequency spectrum may carry other transmissions, requiring techniques such as listen before talk (LBT) procedure (e.g., clear channel assessment (CCA)) to gain access to the unlicensed radio frequency spectrum. These techniques present challenges when using current radio frame formats.

SUMMARY

Techniques for configuring an adaptive frame structure for long term evolution (LTE) systems using unlicensed radio frequency spectrum are described herein.

In accordance with an aspect, a method for wireless communications by a base station (BS) is disclosed. The method generally includes determining one or more network conditions, determining a frame structure from a plurality of frame structures used for data communications based at least in part on the one or more network conditions, wherein each of the plurality of frame structures has a different frame duration, and communicating with a user equipment (UE) using the determined frame structure.

In accordance with an aspect, a method for wireless communications by a user equipment (UE) is disclosed. The method generally includes determining a frame structure from a plurality of frame structures used for data communications, wherein each of the plurality of frame structures has a different frame duration, and communicating with a base station (BS) using the determined frame structure.

In accordance with an aspect, a method for wireless communications. The method generally includes determining a frame structure from a plurality of frame structures used for data communications, wherein each of the plurality of frame structures has a different frame duration, and communicating with an apparatus using the determined frame structure.

In accordance with an aspect, an apparatus for wireless communications is disclosed. The apparatus generally includes a processor configured to determine one or more network conditions, determine a frame structure from a plurality of frame structures used for data communications based at least in part on the one or more network conditions, wherein each of the plurality of frame structures has a different frame duration, and communicate with a user equipment (UE) using the determined frame structure, and a memory coupled to the processor.

In accordance with an aspect, an apparatus for wireless communications is disclosed. The apparatus generally includes a processor configured to determine a frame structure from a plurality of frame structures used for data communications, wherein each of the plurality of frame structures has a different frame duration, and communicate with a base station (BS) using the determined frame structure, and a memory coupled to the processor.

In accordance with an aspect, an apparatus for wireless communications is disclosed. The apparatus generally includes a processor configured to determine a frame structure from a plurality of frame structures used for data communications, wherein each of the plurality of frame structures has a different frame duration, and communicate with another apparatus using the determined frame structure, and a memory coupled to the processor.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 7 illustrates a list of uplink/downlink subframe configurations, in accordance with aspects of the present disclosure.

DETAILED DESCRIPTION

Figure 1:
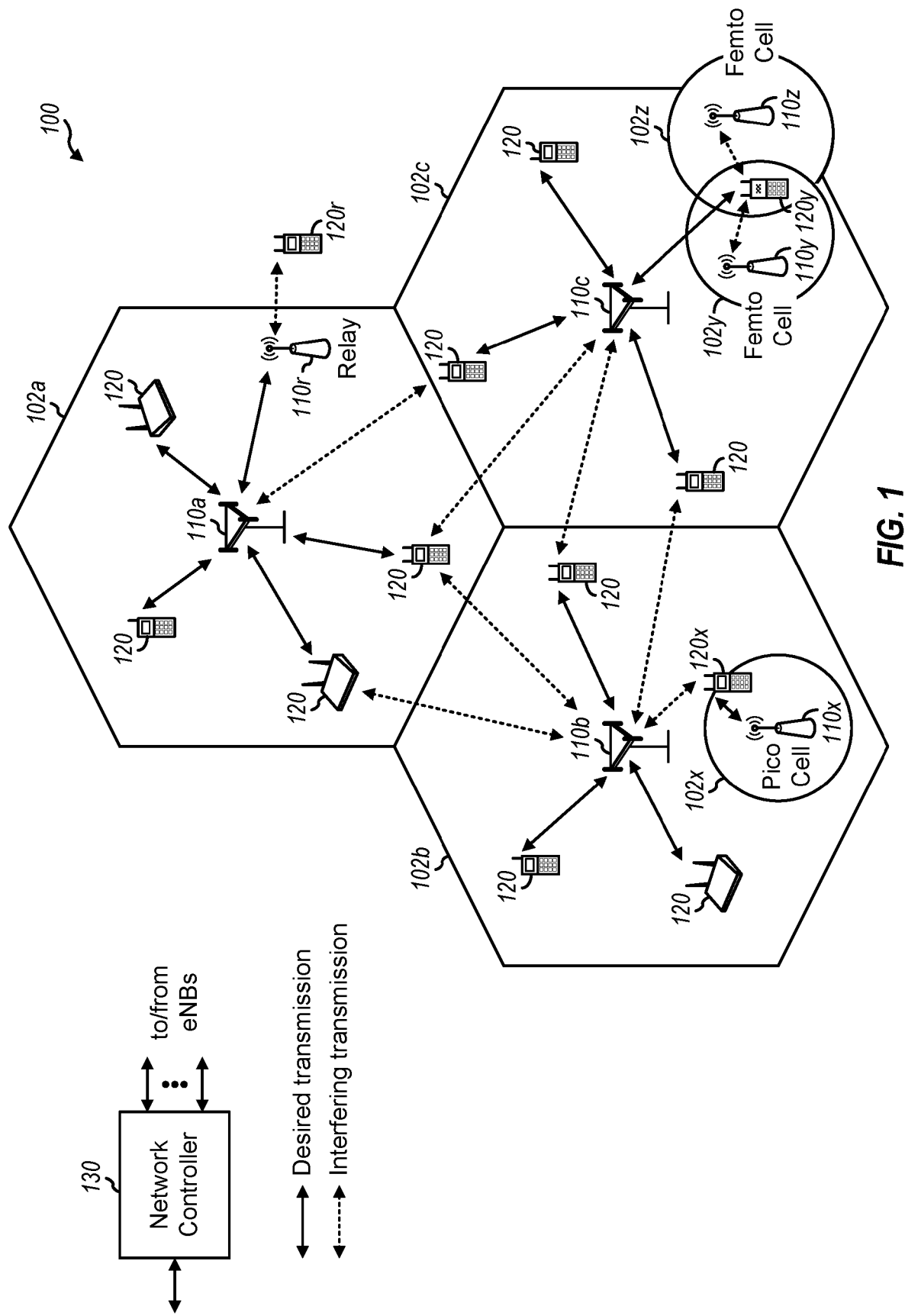
FIG. 1 is a block diagram conceptually illustrating an example of a telecommunications system in accordance with an aspect of the present disclosure.

Demand for wireless communications services continues to grow. Network operators face difficulties in meeting this demand with existing licensed radio frequency spectrum in many areas. Implementing LTE in unlicensed radio frequency spectrum may help to alleviate licensed radio frequency spectrum congestion problems for future wireless demand. Modifications to implement LTE communications in the unlicensed radio frequency spectrum may entail the implementation, for example, of listen before talk (LBT) procedure (e.g., clear channel assessment (CCA)), in order to gain access to the unlicensed radio frequency spectrum. Modifications to implement LTE communications in the unlicensed radio frequency spectrum may also include alteration of frame formats (e.g., by selecting a frame format shorter than an LTE frame format in the licensed radio frequency spectrum). For example, wireless communications may have an adaptive frame structure selected from radio frame durations of 2 ms, 5 ms or 10 ms.

Aspects of the present disclosure provide techniques for configuring an adaptive frame structure for wireless communications using unlicensed radio frequency spectrum. For example, such techniques may allow wireless communications to have an adaptive frame structure (e.g., with variable radio frame durations) using unlicensed radio frequency spectrum.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram conceptually illustrating an example of a telecommunications network system 100 in which an aspects of the present disclosure may be practiced. For example, the telecommunications network system 100 may be an LTE network. The telecommunications network system 100 may include a number of evolved NodeBs (eNodeBs) 110 and user equipment (UEs) 120 and other network entities. An eNodeB 110 may be a station that communicates with the UEs 120 and may also be referred to as a base station, an access point, etc. A NodeB is another example of a station that communicates with the UEs 120. An eNodeB or NodeB may perform operations 1100, set forth in FIG. 11, in accordance with aspects of the present disclosure. Similarly, a UE may perform operations 1300, set forth in FIG. 13, in accordance with aspects of the present disclosure.

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r. Relay stations 110r and 120r may perform operations 1100, set forth in FIG. 11, and/or operations 1300, set forth in FIG. 13, in accordance with aspects of the present disclosure.

The telecommunications network system 100 may be a heterogeneous network that includes eNodeBs 110 of different types, e.g., macro eNodeBs 110a-c, pico eNodeBs 110x, femto eNodeBs 110y-z, relay stations 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
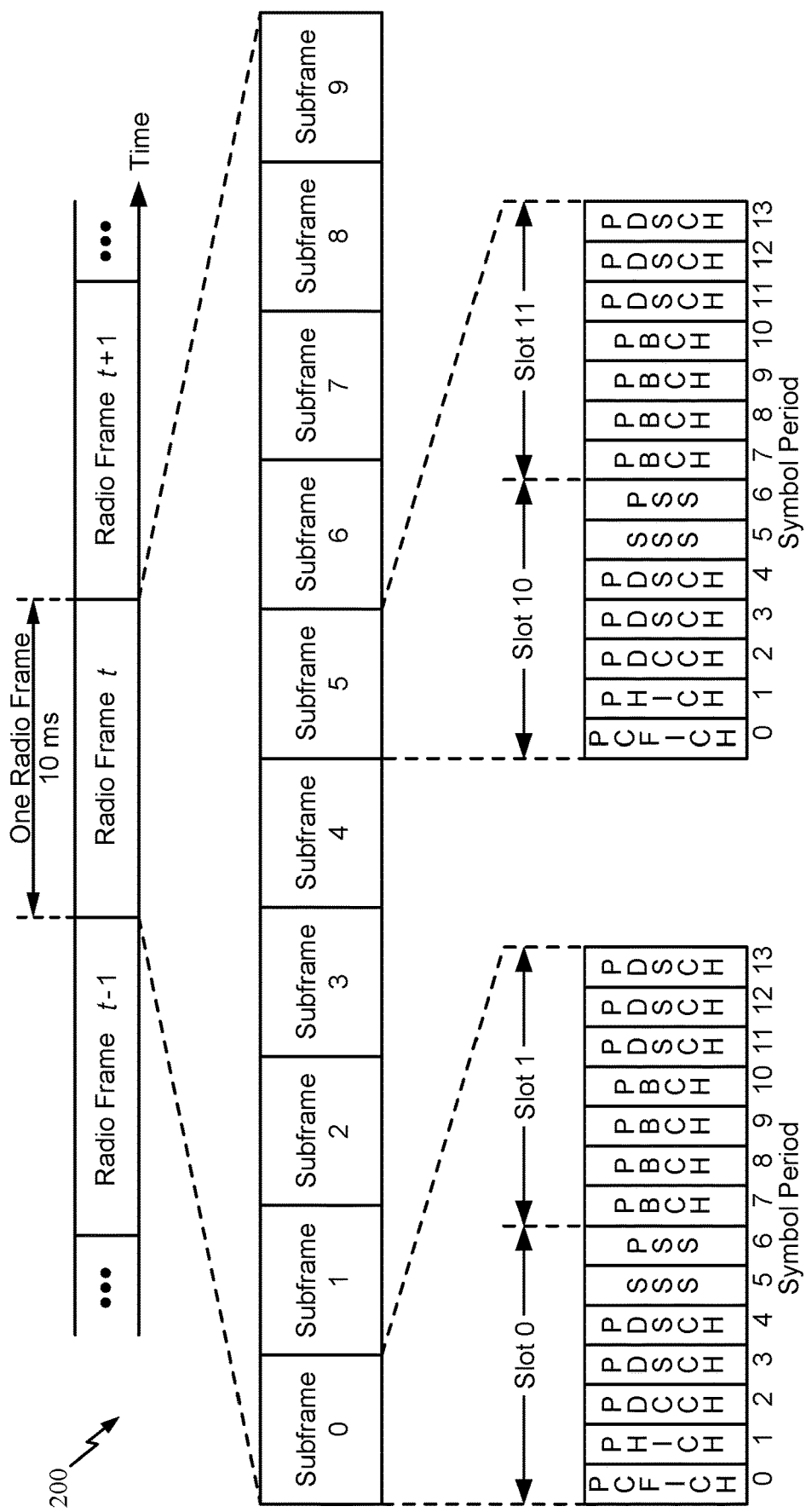
FIG. 2 is a block diagram conceptually illustrating an example of a down link frame structure in a telecommunications system in accordance with an aspect of the present disclosure.

FIG. 2 is a block diagram conceptually illustrating an example of a downlink frame structure in a telecommunications system in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix (not shown). The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send system information in a Physical Broadcast Channel (PBCH) in symbol periods 0 to 3 of slot 1 of subframe 0.

The eNodeB may send information in a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send information in a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it may be understood that the PDCCH and PHICH are also included in the first symbol period. Similarly, the PHICH and PDCCH are also both in the second and third symbol periods, although not shown that way in FIG. 2. The eNodeB may send information in a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 3:
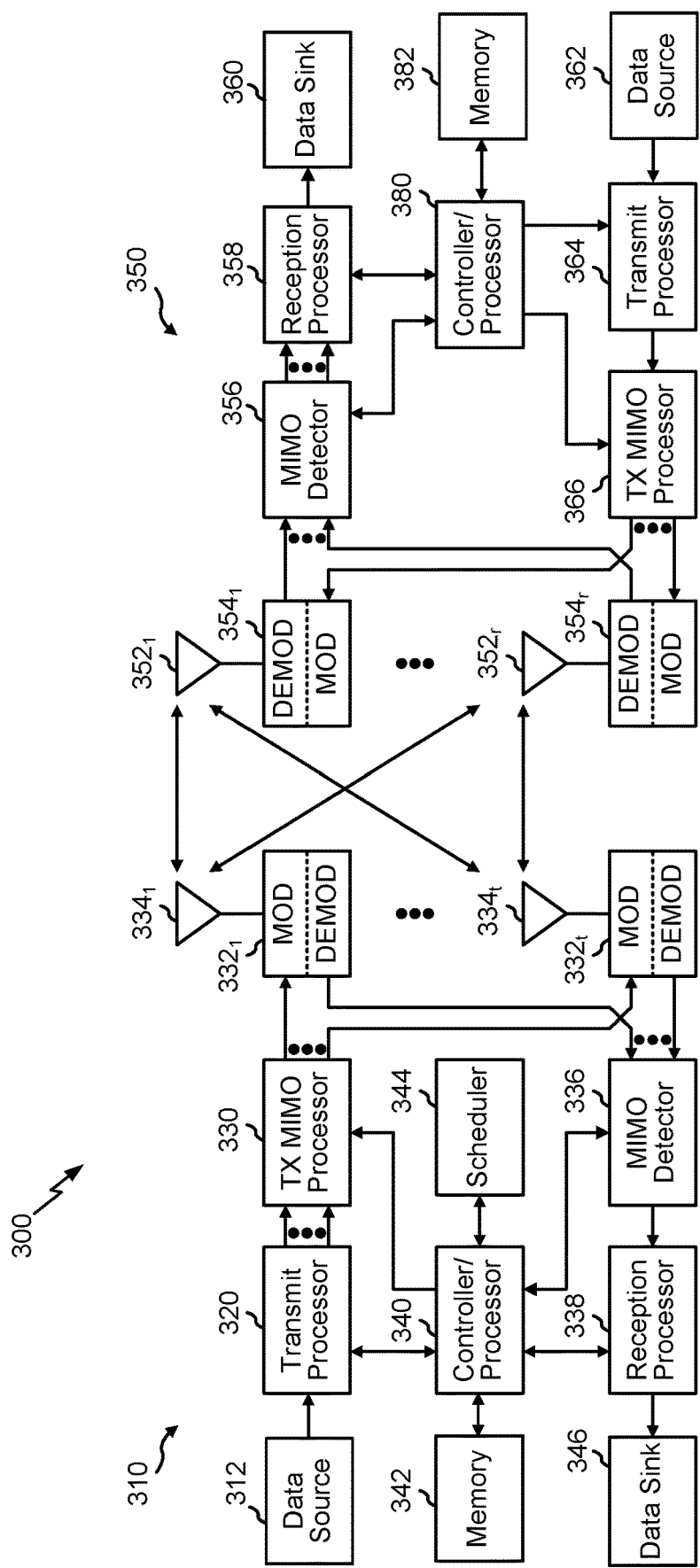
FIG. 3 is a block diagram conceptually illustrating an exemplary eNodeB and an exemplary UE configured in accordance with an aspect of the present disclosure.

FIG. 3 is a block diagram conceptually illustrating an exemplary eNodeB 310 and an exemplary UE 350 configured in accordance with an aspect of the present disclosure. For example, the base station/eNodeB 310 and the UE 350, as shown in FIG. 3, may be one of the base stations/eNodeBs 110 and one of the UEs 120 in FIG. 1. The base station 310 may be equipped with antennas $334_{1-t}$, and the UE 350 may be equipped with antennas $352_{1-r}$, wherein t and r are integers greater than or equal to one.

At the base station 310, a base station transmit processor 320 may receive data from a base station data source 312 and control information from a base station controller/processor 340. The control information may be carried on the PBCH, PCFICH, PHICH, PDCCH, etc. The data may be carried on the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station MOD/DEMOD 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 350, the UE antennas $352_{1-r}$ may receive the downlink signals from the base station 310 and may provide received signals to the UE modulators/demodulators (MODs/DEMODs) $354_{1-r}$, respectively. Each UE MOD/DEMOD 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 350 to a UE data sink 360, and provide decoded control information to a UE controller/processor 380.

On the uplink, at the UE 350, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the base station 310. At the base station 310, the uplink signals from the UE 350 may be received by the base station antennas 334, processed by the base station modulators/demodulators 332, detected by a base station MIMO detector 336 if applicable, and further processed by a base station reception processor 338 to obtain decoded data and control information sent by the UE 350. The base station reception processor 338 may provide the decoded data to a base station data sink 346 and the decoded control information to the base station controller/processor 340.

The base station controller/processor 340 and the UE controller/processor 380 may direct the operation at the base station 310 and the UE 350, respectively. The base station controller/processor 340 and/or other processors and modules at the base station 310 may perform or direct, e.g., the execution of various processes for the techniques described herein. For example, the base station controller/processor 340 may perform or direct the operations 1100 set forth in FIG. 11. The UE controller/processor 380 and/or other processors and modules at the UE 350 may also perform or direct, e.g., the execution of the operations 1300 set forth in FIG. 13, and/or other processes for the techniques described herein. The base station memory 342 and the UE memory 382 may store data and program codes for the base station 310 and the UE 350, respectively. A scheduler 344 may schedule UEs 350 for data transmission on the downlink and/or uplink.

In one configuration, the base station 310 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 340, the base station memory 342, the base station transmit processor 320, the base station modulators/demodulators 332, and the base station antennas 334 configured to perform the functions recited by the aforementioned means. In another aspect, the aforementioned means may be a module or any apparatus configured to perform the functions recited by the aforementioned means. In one configuration, the UE 350 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 380, the UE memory 382, the UE reception processor 358, the UE MIMO detector 356, the UE modulators/demodulators 354, and the UE antennas 352 configured to perform the functions recited by the aforementioned means. In another aspect, the aforementioned means may be a module or any apparatus configured to perform the functions recited by the aforementioned means.

Figure 4:
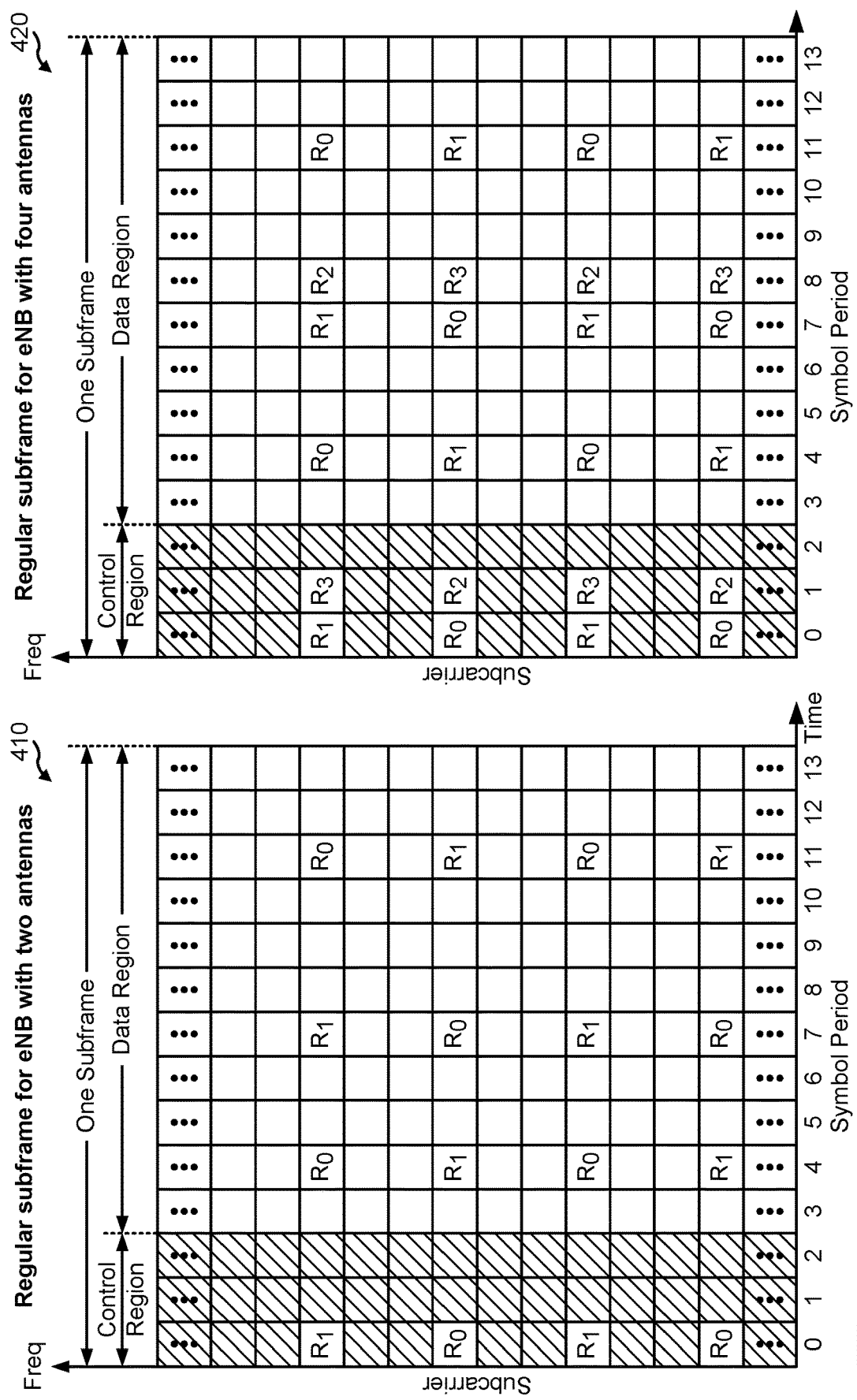
FIG. 4 illustrates various exemplary subframe resource element mappings, in accordance with aspects of the present disclosure.

FIG. 4 illustrates various exemplary subframe resource element mappings in accordance with an aspect of the present disclosure. For example, FIG. 4 illustrates two exemplary subframe formats 410 and 420 for the downlink with the normal cyclic prefix. The available time frequency resources for the downlink may be partitioned into resource blocks. Each resource block may include 12 subcarriers in one slot and may include a number of resource elements. Each resource element may correspond to one subcarrier in one symbol period and may be used to send one modulation symbol, which may be a real or complex value.

The subframe format 410 may be used for an eNodeB equipped with two antennas. A common reference signal (CRS) may be transmitted from antennas 0 and 1 in symbol periods 0, 4, 7 and 11. A common reference signal (CRS) is a signal that is known a priori by a transmitter and a receiver and may also be referred to as a pilot signal. A common reference signal (CRS) may be a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. The subframe format 420 may be used for an eNodeB equipped with four antennas. A common reference signal (CRS) may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNodeBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in a communication network (e.g., LTE network). For example, Q interlaces with indices of 0 through Q−1 may be defined, where Q may be equal to 4, 6, 8, 10, or some other value. Each interlace may include subframes that may be spaced apart by Q subframes. In particular, interlace q may include subframes q, q+Q, q+2Q, etc., where q ∈ (0, 1, . . . , Q−1).

The wireless communication network may support hybrid automatic retransmission (HARQ) for data transmission on the downlink and uplink. For HARQ, a transmitter (e.g., at an eNodeB) may send one or more transmissions of a data packet until the data packet is decoded correctly by a receiver (e.g., at a UE) or some other termination condition is encountered. For synchronous HARQ, all transmissions of the data packet may be sent in subframes of a single interlace. For asynchronous HARQ, each transmission of the data packet may be sent in any subframe.

A UE may be located within the geographic coverage area of multiple eNodeBs. One of the eNodeBs may be selected to serve the UE and may be called "serving eNodeB," while other eNodeB(s) may be called "neighboring eNodeB(s)." The serving eNodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more neighboring eNodeBs.

UEs (e.g., LTE-Advanced enabled UEs) may use spectrum of up to 20 MHz bandwidths for each component carrier. A plurality of component carriers may be allocated in a carrier aggregation configuration of up to a total of 100 MHz (5 component carriers) used for transmission and reception. For the LTE-Advanced enabled wireless communication systems, two types of carrier aggregation (CA) methods have been proposed, contiguous CA and non-contiguous CA, which are illustrated in FIGS. 5 and 6, respectively.

Figure 5:
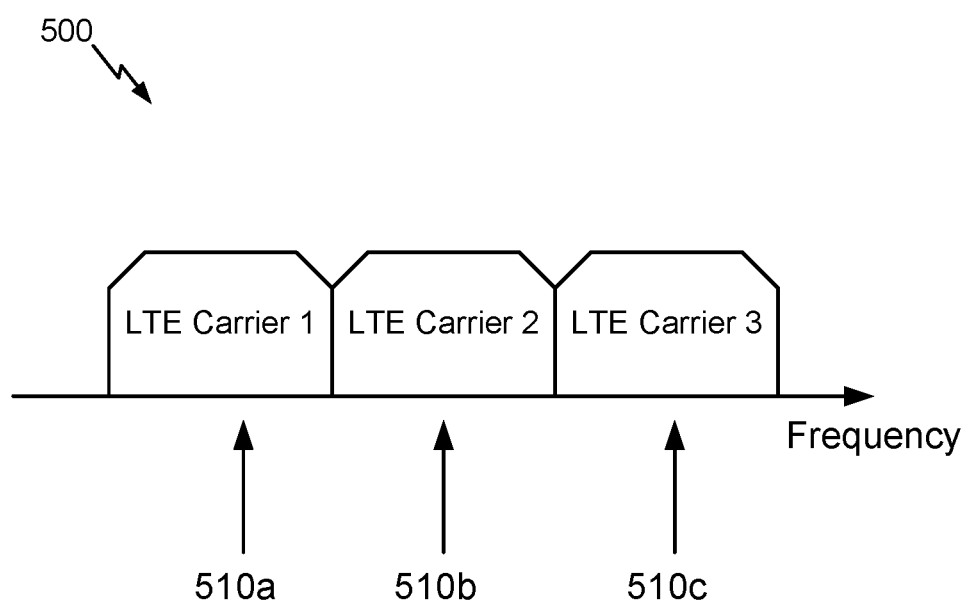
FIG. 5 illustrates contiguous carrier aggregation, in accordance with aspects of the present disclosure.

FIG. 5 illustrates contiguous CA 500, in which multiple available component carriers 510 adjacent to each other along the frequency band are aggregated. As illustrated, component carriers 510a, 510b, and 510c are adjacent to each other along the frequency band and aggregated together in a contiguous CA configuration. While three component carriers are illustrated, more or fewer component carriers may be aggregated in a contiguous CA configuration.

Figure 6:
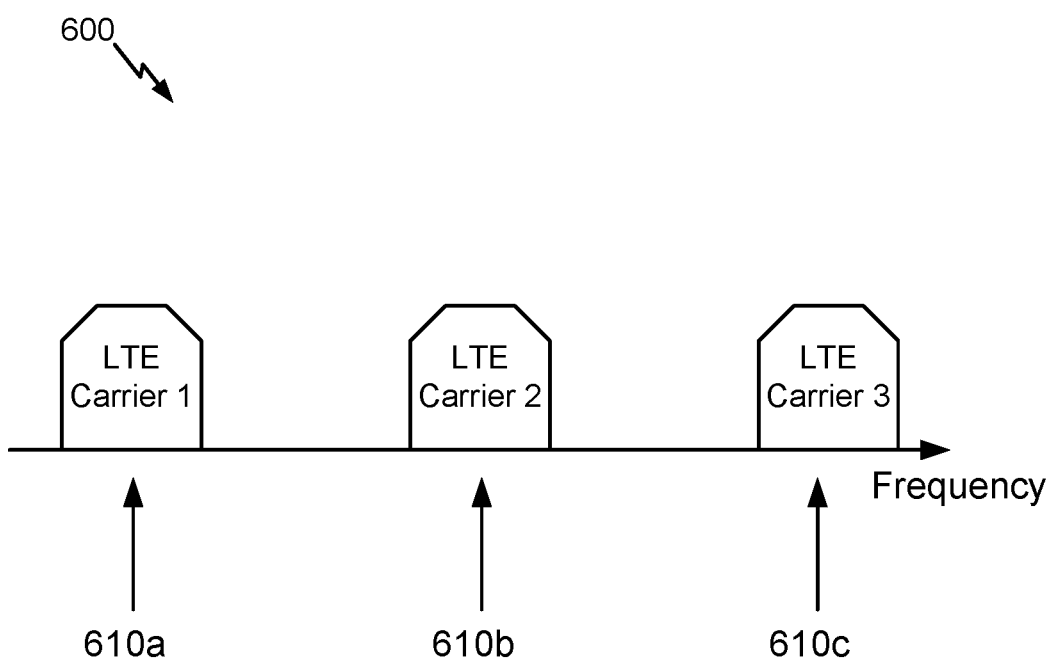
FIG. 6 illustrates non-contiguous carrier aggregation, in accordance with aspects of the present disclosure.

FIG. 6 illustrates non-contiguous CA 600, in which multiple available component carriers 610 separated along the frequency band are aggregated. As illustrated, component carriers 610a, 610b, and 610c are separated along the frequency band and aggregated together in a non-contiguous CA configuration. While three component carriers are illustrated, more or fewer component carriers may be aggregated in a non-contiguous CA configuration.

Both non-contiguous and contiguous CA may aggregate multiple component carriers to serve a single LTE-Advanced UE. In various examples, the UE operating in a multicarrier system (also referred to as carrier aggregation) is configured to aggregate certain functions of multiple carriers, such as control and feedback functions, on the same carrier, which may be referred to as a "primary component carrier" (PCC) or "primary carrier." The remaining carriers that depend on the primary carrier for support may be referred to as "secondary component carriers" (SCC) or "associated secondary carriers." For example, the control functions, such as those provided by the optional dedicated channel (DCH), the nonscheduled grants, a physical uplink control channel (PUCCH), and/or a physical downlink control channel (PDCCH) for multiple component carriers may be carried/transmitted on a PCC of a cell.

In certain wireless communications networks, such as LTE networks, both Frequency Division Duplex (FDD) and Time Division Duplex (TDD) frame structures are supported. In a network using FDD, BSs transmit and UEs receive on a first set of frequencies, while UEs transmit and BSs receive on a second set of frequencies. The FDD frame structure may be a radio frame having ten subframes of equal length, and all subframes may be used for either uplink or downlink. In a network using TDD, BSs transmit and UEs receive at certain times, while UEs transmit and BSs receive at certain other times, all on the same set of frequencies. Accordingly, the TDD frame structure may be a radio frame having ten subframes of equal length, with some subframes used for uplink, other subframes used for downlink, and some subframes, referred to as special subframes, used for switching from downlink to uplink.

FIG. 7 illustrates 7 possible DL and UL subframe configurations supported by LTE networks using TDD. It may be noted that there are 2 switching periodicities, 5 ms and 10 ms. Configurations 0, 1, 2, and 6 have a 5 ms switching periodicity, and configurations 3, 4, and 5 have a 10 ms switching periodicity. For 5 ms switching periodicity, there are two special subframes (S) in one radio frame (e.g., with duration of 10 ms). For 10 ms switching periodicity, there is one special subframe (S) in one radio frame. The other subframes are designated as either downlink subframes (D) or uplink subframes (U). The present methods and apparatus may be employed when a larger or smaller number of subframe configurations are supported.

In LTE Rel-12, it is possible to dynamically adapt different TDD DL/UL subframe configurations based on the actual traffic needs, also known as evolved interference management for traffic adaptation (eIMTA). For example, if a large data burst on downlink is needed during a short period of time, the subframe configuration may be adaptively changed, for example, from uplink-downlink configuration #1 (6 DL and 4 UL subframes) to uplink-downlink configuration #5 (9 DL and 1 UL subframes). In some cases, the adaptation of TDD configuration is expected to be no slower than 640 ms. In an extreme case, the adaptation may be expected to be as fast as 10 ms.

As noted above, the use of unlicensed radio frequency spectrum may enhance wireless communications systems by providing extra bandwidth.

For example, implementing LTE in unlicensed radio frequency spectrum has been considered to alleviate spectrum congestion problems for future wireless needs. Implementing LTE in unlicensed radio frequency spectrum may require modifications from LTE implementations in licensed radio frequency spectrum. Modifications to implement LTE communications in the unlicensed radio frequency spectrum may entail, for example, the implementation of listen before talk (LBT) procedure including a clear channel assessment (CCA) in order to gain access to the unlicensed radio frequency spectrum. LBT may include receiving on a channel and determining whether or not a signal may be demodulated from what is received on the channel. CCA may include receiving on a channel and determining whether an amount of energy detected on the channel during a period of time exceeds a threshold amount of energy. An LBT procedure (e.g., a CCA) may be performed before any direction change (from uplink to downlink or downlink to uplink), after any idle time, or periodically. Communications in unlicensed radio frequency spectrum may include optimization of frame formats to reduce LBT overhead through an adaptation of a plurality of frame structures having different frame durations.

In previous LTE standards (e.g., Rel-8), various forms of adaptive channel structures have been proposed or adopted. For example, time division duplex (TDD) with eIMTA allows for uplink and downlink direction changes when there is more "bursty" traffic in one direction. Another example is frequency division duplex (FDD) with new carrier type (NCT), which adaptively allows discontinuous transmission on the downlink on a millisecond scale when there is no traffic on a channel. Yet another proposal is small cell operation with opportunistic dormancy, which may occur over a longer time scale than discontinuous transmission.

TDD with eIMTA and other adaptive channel structure techniques can result in interference between uplink and downlink transmissions. For example, a cell may adaptively select uplink-downlink configuration 5 (9 DL and 1 UL subframes) in order to accommodate a large burst of DL traffic. In the example, a neighboring cell may adaptively select uplink-downlink configuration 1 (6 DL and 4 UL subframes). A UE served by the first cell that is located near the border of the neighboring cell may attempt to receive a DL transmission in subframe 3 and may receive interference from a UE served by the neighboring cell that is transmitting an UL transmission. Similarly, the BS of the neighboring cell attempting to receive an UL transmission in subframe 3 may receive interference from a DL transmission in the first cell.

Figure 8:
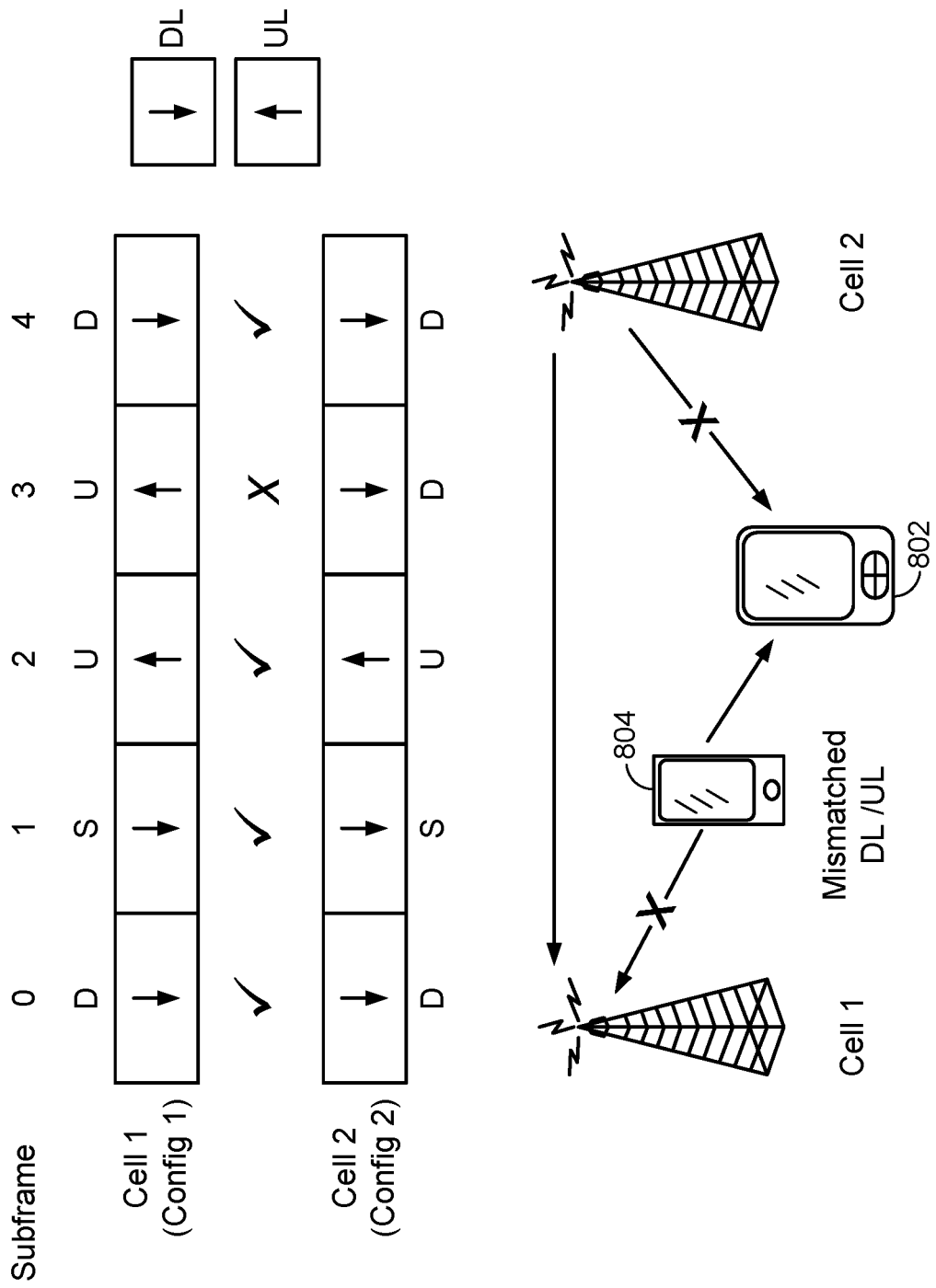
FIG. 8 illustrates an example of interference between uplink and downlink transmissions in multiple cells, in accordance with aspects of the present disclosure.

FIG. 8 illustrates an example of interference between uplink and downlink transmissions on multiple cells in accordance with an aspect of the present disclosure. An interfering transmission is illustrated in subframe 3, where Cell 1 is expecting an uplink signal and Cell 2 is transmitting on a downlink on the same frequency band. Between eNBs, such a situation may cause the receiving eNB (e.g., Cell 1) to experience severe interference from the transmitting eNB (e.g., Cell 2). Interference between UEs may also occur, for example, a UE 802 served by Cell 2 expecting a downlink transmission may experience interference from a nearby UE 804 served by Cell 1 performing an uplink transmission.

In order to avoid interference between uplink and downlink transmissions, a network may implement eIMTA for TDD with certain subframes designated as "anchor" subframes that are always the same. That is, the network may designate one or more subframes in every frame as anchor subframes that are always DL subframes, and one or more other subframes as anchor subframes that are always UL subframes. A cell of that network may schedule transmissions in the anchor subframes to avoid interference between uplink and downlink transmissions. For example, a cell may serve two UEs, with a first UE near the BS of the cell, and a second UE near a cell-edge. In the example, the BS may schedule UL transmissions of the second UE in anchor UL subframes to avoid UL DL interference, while scheduling UL transmissions for the first UE in non-anchor subframes. In the example, UL transmissions from the first UE, which are interfered with by DL transmissions from another cell, will be more easily received by the BS because of the UE's nearness to the BS.

Figure 9:
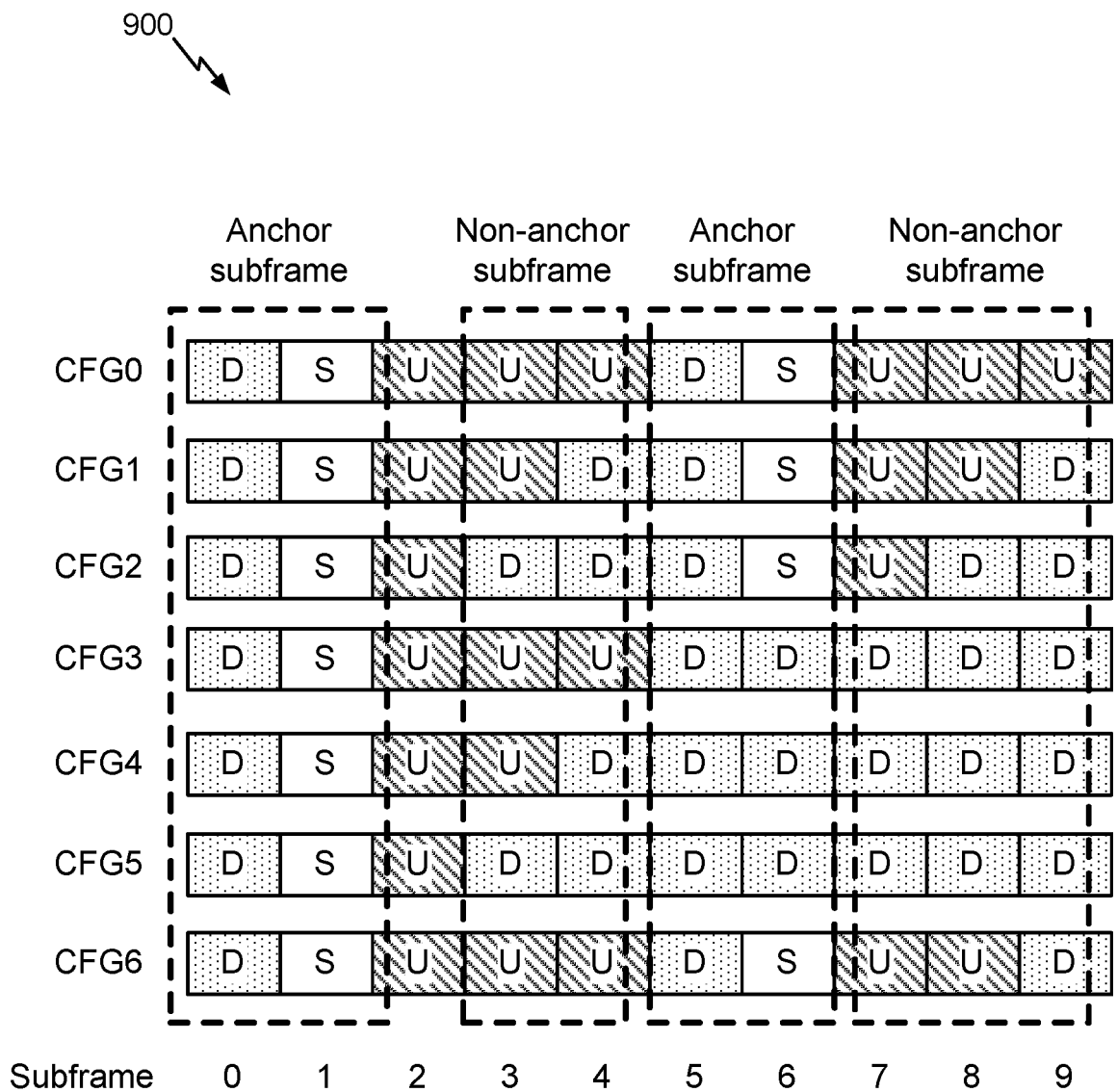
FIG. 9 illustrates various uplink-downlink subframe configurations having anchor subframes and non-anchor subframes, in accordance with aspects of the present disclosure.

FIG. 9 illustrates various uplink-downlink subframe configurations 900 having anchor subframes and non-anchor subframes in accordance with aspects of the present disclosure. It may be noted that the subframe configurations illustrated in FIG. 9 are identical to the configurations illustrated in FIG. 7. An anchor subframe based design may be used to reduce interference. In an aspect, anchor subframes may be subframes 0-1 and subframes 5-6, as illustrated in FIG. 9.

For wireless communications in unlicensed radio frequency spectrum, interference handling may be different from interference handling in eIMTA. In eIMTA, when interference is present, the received signal quality may be degraded, but the eNB and UE may still continue to communicate. In communications in unlicensed radio frequency spectrum, interference may cause the CCA to fail. That is, an eNB or UE may detect interference (e.g., UL-DL interference, as illustrated in FIG. 8) when performing a CCA and determine that the channel is occupied. Due to the failure of the CCA, the eNB and UE may not be allowed to transmit.

Frame structure may differ between eIMTA and communications in unlicensed radio frequency spectrum. In eIMTA, subframe configurations of frames may be constrained to seven configurations, each having guaranteed anchor subframes in each 10 millisecond frame, as illustrated in FIG. 9. Due to regulatory requirements, cells implementing communications in unlicensed radio frequency spectrum may be limited to a guaranteed transmission less often than once per 10 ms frame (e.g., only during CCA Exempt Transmission (CET) times, which may comprise a window for transmission of downlink and/or uplink signals occurring once every 80 milliseconds). Communications in unlicensed radio frequency spectrum may follow the 10 millisecond frame length of eIMTA and also support various other configurations; for example, communications in unlicensed radio frequency spectrum may also allow for a frame duration of 2 milliseconds.

Adaptation rates may also differ between eIMTA and communications in unlicensed radio frequency spectrum. eIMTA may support fast adaptation with dynamic signaling through the presence of anchor subframes at least every 10 milliseconds. Wireless communications using unlicensed radio frequency spectrum may have an adaptation with guaranteed signaling every 80 milliseconds. Wireless communications using unlicensed radio frequency spectrum may also provide for shorter intervals between CCAs and a corresponding impact of higher overhead.

Due to regulatory requirements for broadcasts in unlicensed radio frequency spectra, LBT procedures (e.g., a CCA) may be required when performing wireless communications using unlicensed radio frequency spectrum. An LBT procedure (e.g., a CCA) may be performed before any direction change (from uplink to downlink or downlink to uplink), after any idle time, or periodically. Further, transmissions on unlicensed radio frequency spectra may require radar detection. On the eNB side, radar detection may entail taking sufficient time to listen for radar signals before transmitting to prevent downlink transmissions from colliding with radar signals. From the UE side, uplink transmissions may be allowed without radar detection, if radar signals are sufficiently strong.

Figure 10:
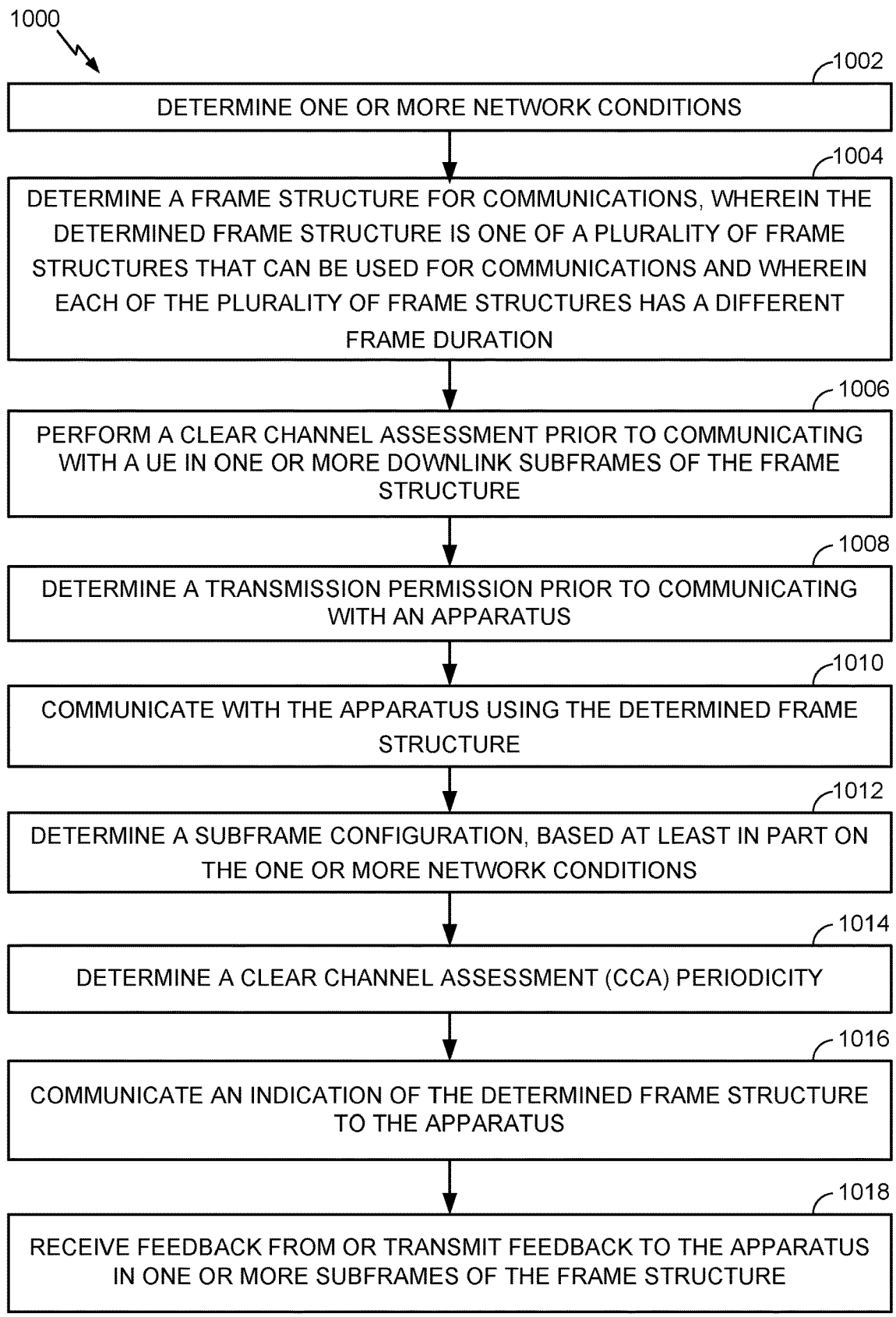
FIG. 10 illustrates exemplary operations that may be performed by a wireless communications device, in accordance with aspects of the present disclosure.

FIG. 10 sets forth example operations 1000, performed, for example, by a base station, eNodeB, user equipment (UE), or other device for adapting frame structure for wireless communications using unlicensed radio frequency spectrum, in accordance with aspects of the present disclosure.

Operations 1000 may optionally begin, at 1002, by determining one or more network conditions, wherein the network conditions may, for example, comprise network traffic conditions, interference conditions, radar detection, or other network conditions. At 1004, operations 1000 continue by determining a frame structure for communications, wherein the determined frame structure is one of a plurality of frame structures that can be used for communications and wherein each of the plurality of frame structures has a different frame duration. The frame structure may, for example, be determined based at least in part on the one or more network conditions. In one example, each of the plurality of frame structures may have either all subframes are uplink subframes or all subframes are downlink subframes, and the frame structure may be determined based on a clear channel assessment (CCA) contention process. Operations 1000 may optionally continue at 1006 by performing a clear channel assessment prior to communicating with a UE in one or more downlink subframes of the frame structure. The optional clear channel assessment may, for example, be performed based on an offset value from a frame boundary and different offset values may be assigned to give different priorities to different transmitting entities. At 1008, operations 1000 may optionally continue by determining a transmission permission prior to communicating with an apparatus. Operations 1000 continue, at 1010, by communicating with the apparatus using the determined frame structure.

At 1012, operations 1000 may optionally continue by determining a subframe configuration, based at least in part on the one or more network conditions. Operations 1000 may optionally continue at 1014 by determining a clear channel assessment (CCA) periodicity. The determined CCA periodicity may be optionally based at least in part on a shortest length frame structure of the plurality of frame structures, and may be different from a CCA periodicity of the apparatus. At 1016, operations 1000 may optionally continue by communicating an indication of the determined frame structure to the apparatus. The optional indication may be communicated via, for example, a clear channel assessment exempt transmission, a common control signal, a primary component carrier, and/or other techniques. At 1018, operations 1000 may continue by receiving feedback from or transmitting feedback to the apparatus in one or more subframes of the frame structure. The subframes in which feedback is received or transmitted may, for example, comprise subframes having a same uplink or downlink direction as subframes in a reference subframe configuration and/or subframes that are designated as uplink subframes in each of multiple available subframe configurations.

Figure 11:
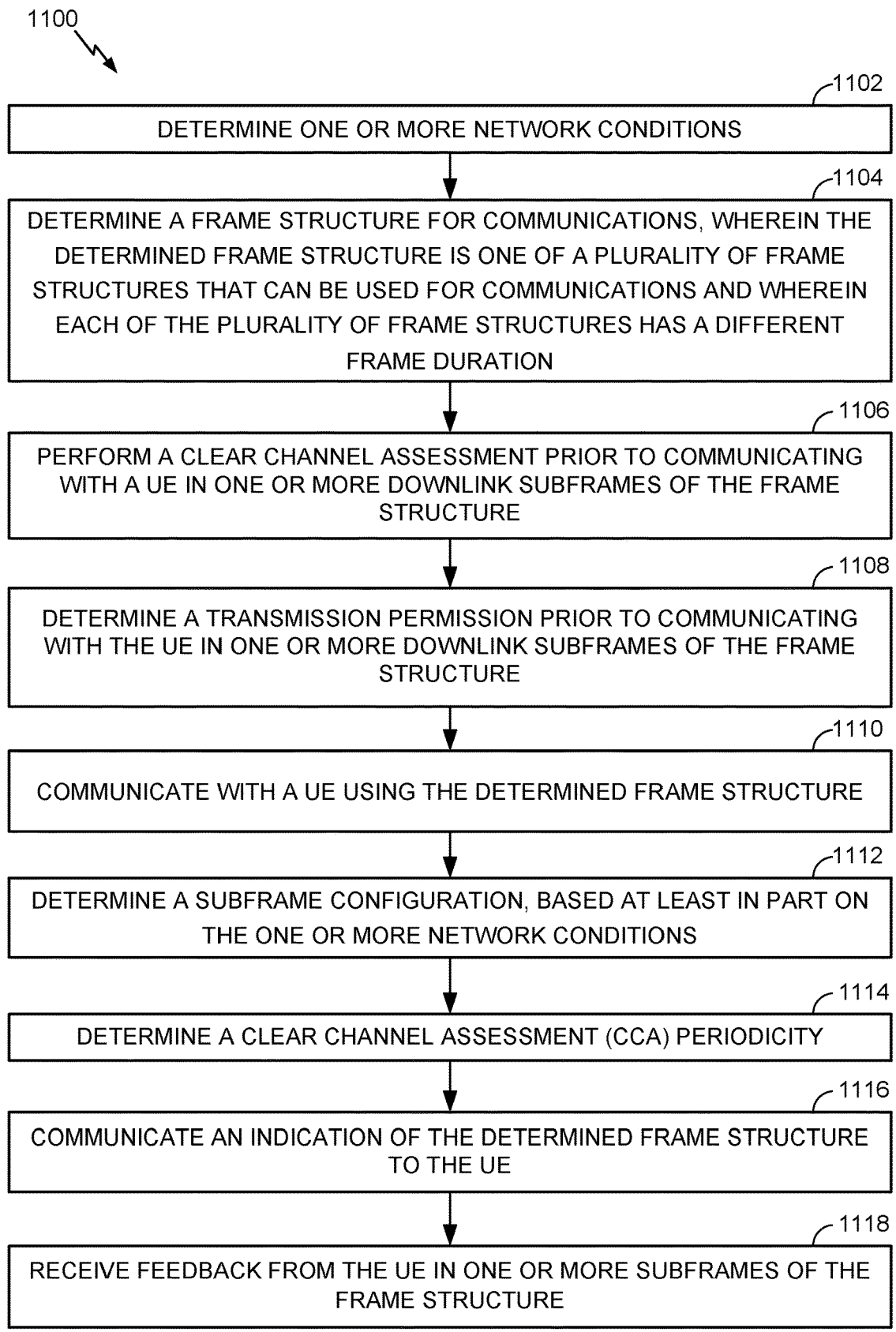
FIG. 11 illustrates exemplary operations that may be performed by a base station (BS), in accordance with certain aspects of the present disclosure.
Figure 13:
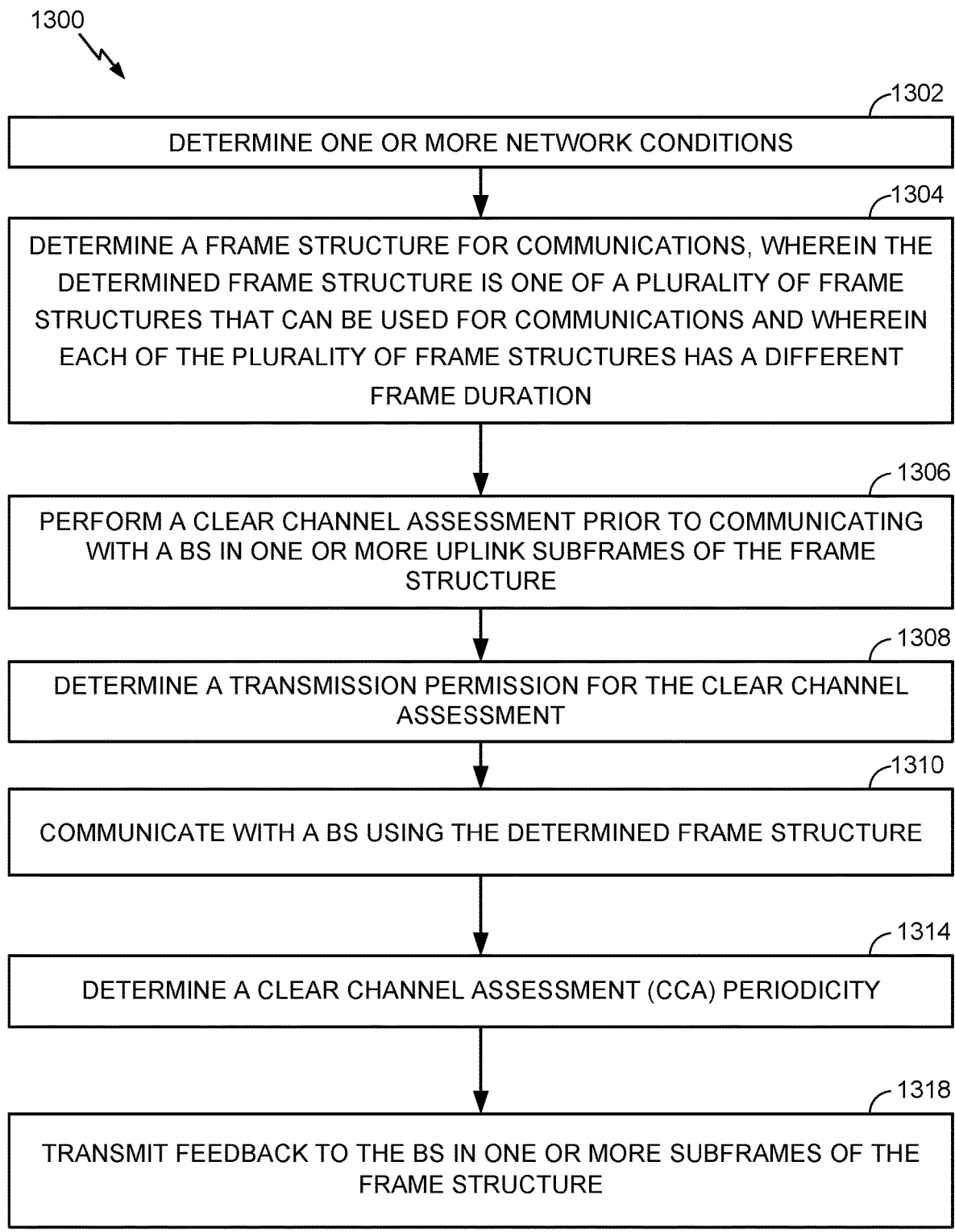
FIG. 13 illustrates exemplary operations that may be performed by a user equipment (UE), in accordance with certain aspects of the present disclosure.

As noted above, operations 1000 may be performed by either a UE (e.g., to communicate with an eNodeB) or by an eNodeB (e.g., to communicate with a UE). FIG. 11 illustrates example operations that may be performed by an eNodeB, while FIG. 13 illustrates example operations that may be performed by a UE. Thus, these figures may be considered device-specific examples of operations 1000 shown in FIG. 10.

FIG. 11 sets forth example operations 1100, performed, for example, by a base station (BS), for adapting frame structure for LTE systems using unlicensed radio frequency spectrum, in accordance with aspects of the disclosure. Operations 1100 may optionally begin at 1102. At 1102, the BS may determine one or more network conditions. For example, the BS may determine that a large data burst on downlink is needed. In another example, the BS may detect interference from other BSs or UEs. In other examples, the BS may detect radar signals. At 1104, the BS may determine a frame structure for communications, wherein the determined frame structure is one of a plurality of frame structures that can be used for communications and wherein each of the plurality of frame structures has a different frame duration. For example, one frame structure may have a duration of 10 subframes, while another frame structure may have a duration of 2 subframes or a duration of 5 subframes. It may be appreciated by one of ordinary skill in the art that a frame structure can have any number of subframes. In one example, each of the plurality of frame structures may have either all subframes are uplink subframes or all subframes are downlink subframes, and the frame structure may be determined based on a clear channel assessment (CCA) contention process. In an aspect, the determination may be based at least in part on the one or more network conditions determined in 1102. Operations 1100 may optionally continue at 1106 by the BS performing a clear channel assessment prior to communicating with a UE in one or more downlink subframes of the frame structure. The optional clear channel assessment may, for example, be performed based on an offset value from a frame boundary and different offset values may be assigned to give different priorities to different transmitting entities. At 1108, operations 1100 may optionally continue by the BS determining a transmission permission prior to communicating with the UE in one or more downlink subframes of the frame structure. At 1110, the BS may communicate with a UE using the determined frame structure.

At 1112, operations 1100 may optionally continue by the BS determining a subframe configuration, based at least in part on the one or more network conditions. Operations 1100 may optionally continue at 1114 by the BS determining a clear channel assessment (CCA) periodicity. The determined CCA periodicity may be optionally based at least in part on a shortest length frame structure of the plurality of frame structures, and may be different from a CCA periodicity of the UE. At 1116, operations 1100 may optionally continue by the BS communicating an indication of the determined frame structure to the UE. The optional indication may be communicated via, for example, a clear channel assessment exempt transmission, a common control signal, a primary component carrier, and/or other techniques. At 1118, operations 1100 may continue by the BS receiving feedback from the UE in one or more subframes of the frame structure. The subframes in which feedback is received may, for example, comprise subframes having a same uplink direction as subframes in a reference subframe configuration and/or subframes that are designated as uplink subframes in each of multiple available subframe configurations.

According to certain aspects, the BS may determine a subframe configuration of the frame structure based at least in part on the one or more network conditions. For example, a portion of the frame may have no data traffic. The frame structure may be dynamically configured by the BS to have idle subframes for the portion of the frame that has no data traffic. In an aspect involving high traffic load to the UE, the BS may configure the frame structure to have more downlink subframes in order to accommodate the downlink data traffic. In an aspect involving high traffic load from the UE, the BS may configure the frame structure to have more uplink subframes in order to accommodate the uplink data traffic.

According to certain aspects, the one or more network conditions may comprise at least one of network traffic conditions, interference conditions, and radar detection. For example, in the Federal Communications Commission (FCC) regulated region, radar detection may occur every 2 ms, and a BS may determine a frame structure without DL transmissions at least every 2 ms, so that the BS can perform the necessary radar detection. In the European Telecommunications Standard Institute (ETSI) regulated region, radar detection may occur every 1.5 ms, and a BS may determine a frame structure allowing for radar detection (e.g., without DL transmissions during radar detection times) at least every 1.5 ms.

According to certain aspects, the BS may perform a clear channel assessment (CCA) prior to communicating with the UE in one or more downlink subframes of the frame structure. The CCA may be performed to verify whether the communication channel in the unlicensed radio frequency spectrum is occupied. In certain aspects, the performance of a CCA by the BS prior to communicating with the UE may comprise determining a clear channel assessment periodicity based at least in part on a shortest length frame structure of the plurality of frame structures. This may help ensure that each CCA period coincides with a possible transmission opportunity, regardless of which frame structure is actually being used. For example, in a system where a BS dynamically selects between frame structures of 2 ms, 4 ms, 8 ms, or 10 ms, the BS may use a CCA periodicity of 2 ms. As another example, in a system where a BS dynamically selects between frame structures of 5 ms or 10 ms, the BS may use a CCA periodicity of 5 ms. In both of these examples, because the CCA periodicity is an integral factor of the lengths of each frame structure, the BS may avoid having to change CCA periodicities when dynamically switching between different frame structures.

According to certain aspects, performance of a CCA by the BS prior to communicating with the UE may comprise determining a clear channel assessment periodicity based at least in part on a scheduled data transmission. For example, a BS may determine that the BS will schedule a transmission to a UE in 4 ms, and determine a CCA periodicity of 4 ms.

According to certain aspects, the BS may perform clear channel assessment with a different periodicity than UEs in the cell served by the BS. For example, a BS may perform CCA with a periodicity of ten subframes, while a served UE performs CCA with a periodicity of two subframes.

According to certain aspects, the BS may perform a CCA based on an offset value from a frame boundary. For example, the CCA may be performed at a configurable period of time (e.g., 30 microseconds before) from a frame boundary.

In an aspect, different offset values may be assigned to give different priorities to different transmitting entities. For example, a smaller CCA offset value may be assigned to lower-priority transmitting entities, while a larger CCA offset value may be assigned to higher-priority transmitting entities. In the example, a higher-priority transmitting entity will determine that the channel is clear and occupy the channel before a lower-priority transmitting entity, because the larger CCA offset value causes the higher-priority entity to begin and complete the CCA earlier than the lower-priority entity.

According to certain aspects, the UE may have a clear channel assessment (CCA) periodicity that is different from the CCA periodicity of the UE's serving base station. For example, UE CCA periodicity may be determined by a shortest possible length of the frame structure. In the example, if the shortest frame structure length that a UE's serving BS will use is 2 milliseconds, the UE may have a clear channel assessment periodicity of 2 milliseconds.

According to certain aspects, the UE may only be permitted to transmit in certain subframes corresponding to the UE clear channel assessment periodicity. For example, if a UE has a clear channel periodicity of four subframes, the UE will only be permitted to transmit in every fourth subframe.

According to certain aspects, the BS may signal an indication of an adapted frame structure to the served UE. The indication may be signaled via at least one of: a clear channel assessment exempt transmission (CET), a common control signal, or a primary component carrier (e.g., cross-carrier signaling from a primary component carrier while using carrier aggregation). The indication may comprise an indication of at least one of a ratio of uplink to downlink subframes (e.g., seven DL to three UL subframes), a selected frame structure (e.g., subframe configuration 4 shown in FIG. 7), or a CCA configuration and priority (e.g., perform CCA with a period of 2 ms and a priority of one on a one to four scale). The frame structure or CCA configuration may be one that is preferred by the BS and, at any given time, the actual frame structure or CCA configuration in use by the BS may be different, e.g., based on changes to network conditions. For example, the actual frame structure in use by a BS may be selected by the BS based on a detected transmission during a CCA. In the example, however, to simplify UE operation and reduce signaling overhead, a UE may base CCA periodicity on the preferred frame structure or CCA configuration.

According to certain aspects, the BS may receive feedback from the UE in certain subframes of the frame structure. The subframes may comprise, for example, subframes that are designated as uplink subframes in a reference subframe configuration, or subframes that are designated as uplink subframes in each of multiple available subframe configurations, similar to anchor subframes as discussed above. One example of anchor subframes for an adaptive frame structure for wireless communications systems using unlicensed radio frequency spectrum is the first one or few (e.g., three) subframes of the adaptive frame structure are always designated as downlink subframes and the last one or few (e.g., two) subframes of the adaptive frame structure are always designated as uplink subframes.

Figure 12:
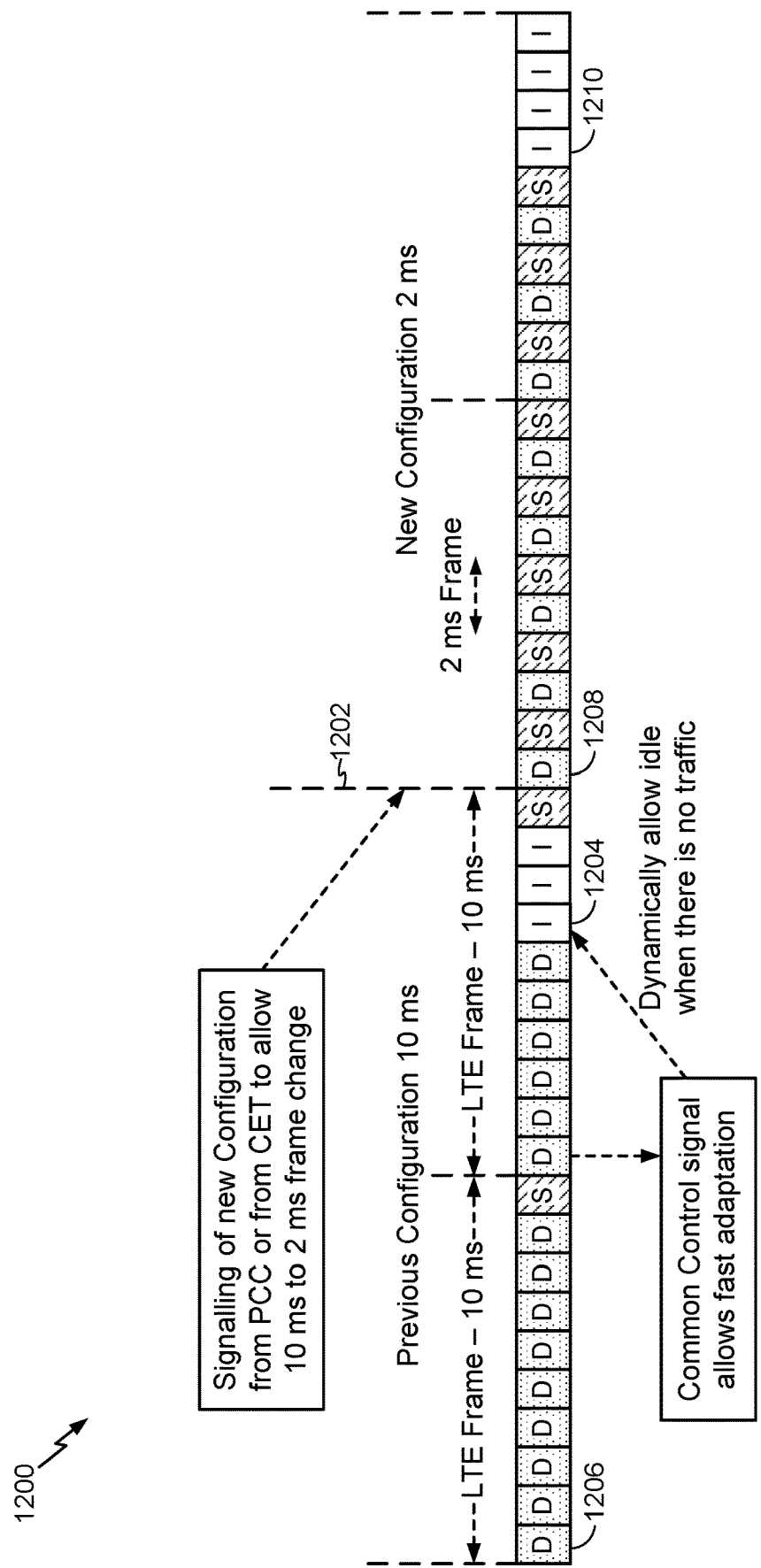
FIG. 12 illustrates an example of various adaptive frame structures, in accordance with aspects of the present disclosure.

FIG. 12 illustrates an exemplary timeline 1200 including various exemplary adaptive frame structures, in accordance with aspects of the present disclosure. In FIG. 12, subframes labeled 'D' are downlink subframes, subframes labeled 'S' are special subframes wherein the transmission direction may change from downlink to uplink, and subframes labeled 'I' are idle subframes. A common control signal (e.g., in licensed radio frequency spectrum) may be sent, e.g., at time 1202, from a base station to allow for fast adaptation of frame structures. The adaptive frame structure may allow for traffic load adaptation. A common control signal may dynamically allow idling subframes where there are no transmissions to be made, for example, where the unlicensed radio frequency spectrum is used for a supplemental downlink (SDL) and there are no transmissions to be made on the SDL, as illustrated at 1204 and 1210. For large traffic loads, the adaptive frame structure (and common control signal) may be configured for 10 millisecond frame duration, as illustrated at 1206. For low traffic loads, the adaptive frame structure may be configured with a shorter frame duration; for example, a frame length of 2 milliseconds, as illustrated at 1208. A CCA may be performed periodically according to the frame structure having a specified frame duration. Direction changes may be made for each frame period.

An adaptive frame structure may also support radar detection by, for example, supporting a frame structure wherein frames are as short as or shorter than a required radar detection period. Radar detection may be scheduled on a region dependent time frame; for example, some regions may require radar detection every 2 milliseconds, while other regions may require radar detection every 1.5 milliseconds. Loading dependent adaptation (for example, additional idle time) may aid in radar detection by, for example, allowing additional radar detection during idle time.

FIG. 13 sets forth example operations 1300, performed, for example, by a user equipment (UE), for adapting frame structure for wireless communications using unlicensed radio frequency spectrum, in accordance with aspects of the present disclosure. The operations 1300 may be considered complementary to operations 1100, described above with reference to FIG. 11. A UE may optionally begin operations 1300 at 1302, by determining one or more network conditions, wherein the network conditions may, for example, comprise network traffic conditions, interference conditions, radar detection, or other network conditions. At 1304, the UE may determine a frame structure for communications, wherein the determined frame structure is one of a plurality of frame structures that can be used for communications and wherein each of the plurality of frame structures has a different frame duration. The frame structure may, for example, be determined based at least in part on the one or more network conditions. In one example, each of the plurality of frame structures may have either all subframes are uplink subframes or all subframes are downlink subframes, and the frame structure may be determined based on a clear channel assessment (CCA) contention process. In another example, the frame structure may be determined based on an indication received from a BS. Operations 1300 may optionally continue at 1306 by performing a clear channel assessment prior to communicating with the BS in one or more uplink subframes of the frame structure. The optional clear channel assessment may, for example, be performed based on an offset value from a frame boundary, and different offset values may be assigned to give different priorities to different transmitting entities. At 1308, operations 1300 may optionally continue by determining a transmission permission prior to communicating with the BS in one or more uplink subframes of the frame structure. For example, the UE may not be allowed to transmit during an upcoming time period due to communication by another network entity using the unlicensed radio frequency spectrum. In such cases, the CCA period may be referred to as a "virtual CCA," because the UE may perform a CCA for the time period but refrain from transmitting even though the CCA indicates the channel is clear. In some cases, the UE may not actually perform the CCA if it is not permitted to transmit. At 1310, the UE communicates with the BS using the determined frame structure.

Operations 1300 may optionally continue at 1314 by the UE determining a clear channel assessment (CCA) periodicity. The determined CCA periodicity may be optionally based at least in part on a shortest length frame structure of the plurality of frame structures, and may be different from a CCA periodicity of the BS. At 1318, operations 1300 may continue by the UE transmitting feedback to the BS in one or more subframes of the frame structure. The subframes in which feedback is transmitted may, for example, comprise subframes having a same uplink direction as subframes in a reference subframe configuration and/or subframes that are designated as uplink subframes in each of multiple available subframe configurations.

According to certain aspects, the UE may perform a clear channel assessment prior to communicating with the BS in one or more uplink subframes of the frame structure. For example, a BS may schedule a UE to perform an uplink (UL) transmission on a frequency in unlicensed radio frequency spectrum. In the example, the UE performs a CCA on the frequency and must find the frequency to be clear before starting the UL transmission. Still in the example, if the UE does not find the frequency to be clear, the UE would not perform the UL transmission and may transmit a scheduling request (SR) or take other steps to get a new UL grant from the BS.

According to certain aspects, the UE may have a clear channel assessment periodicity determined by a shortest length of the frame structure. For example, a UE may support frame structures wherein the length of the frames varies from 2 ms to 10 ms. In the example, the UE is configured to have a CCA periodicity of 2 ms, because that is the shortest length of the supported frame structures. In an aspect, the UE may only be permitted to transmit in certain subframes corresponding to the UE clear channel assessment periodicity. For example, a UE may be configured with a CCA periodicity of 4 ms, and the UE is only permitted to transmit in every fourth subframe, after performing a CCA.

According to certain aspects, the UE may determine a clear channel assessment periodicity based at least in part on a scheduled data transmission. For example, a UE may be semi-persistently scheduled to perform a data transmission in every eighth subframe, and the UE may determine a CCA periodicity of 8 ms, based on the semi-persistently scheduled data transmissions.

According to certain aspects, the UE may perform a clear channel assessment based on an offset value from a frame boundary. For example, the CCA may be performed at a configurable period of time (e.g., 20 microseconds before) from a frame boundary.

According to certain aspects, different offset values may be assigned to give different priorities to different transmitting entities. For example, a CCA offset value of twenty microseconds may be assigned to UEs of one cell, while a CCA offset value of thirty microseconds may be assigned to a BS of a neighboring cell. In the example, the BS will determine that the channel is clear and occupy the channel (e.g., to perform a DL transmission) before the UEs.

According to certain aspects, the determining of a frame structure, as set forth in FIG. 13, may comprise receiving signaling of an indication of the adapted frame structure by the UE. The indication may be received via at least one of a clear channel assessment exempt transmission, a common control signal, or from another component carrier. The indication may comprise an indication of at least one of a ratio of uplink to downlink subframes (e.g., three UL subframes to seven DL subframes), a CCA priority, or a frame structure (e.g., three DL subframes followed by a special subframe, then an UL subframe, and then five idle subframes). For example, a UE may receive a signal from the UE's serving BS that the ratio of downlink to uplink subframes in the unlicensed radio frequency spectrum will be eight to two, and the signal may be sent via a primary component carrier in the licensed radio frequency spectrum.

According to certain aspects, the UE may transmit feedback to the BS in certain subframes of the frame structure. According to certain aspects, the certain subframes may comprise subframes that are designated as uplink subframes in a reference subframe configuration or subframes that are designated as uplink subframes in each of multiple available subframe configurations. For example, subframe 1 may be designated as an uplink subframe in all of the available subframe configurations of a cell implementing adaptive frame structure for wireless communications using unlicensed radio frequency spectrum, and a UE may transmit feedback to the UE's serving BS in subframe 1 of every frame.

According to certain aspects, the UE may perform uplink clear channel assessment dependent on the success of downlink clear channel assessment. For example, when multiple operators share the same spectrum, each operator's base stations may perform a DL CCA. In the example, results of the DL CCAs may determine which operator will be using the frame (e.g., if an operator's base stations' DL CCAs indicate the channel is clear, that operator may use the frame and other operators may not), and only UEs from that same operator may be allowed to perform UL CCA. Still in the example, UEs of other operators cannot use the frame because UEs of the other operators are not allowed to perform UL CCA.

According to certain aspects, DL and UL CCA may both occur at a frame boundary, and the same transmission direction may be used during the entire frame duration. For example, if DL CCA succeeds, the entire frame may be used for DL transmission. In the example, if UL CCA succeeds, the entire frame may be used for UL transmission.

As mentioned above, when implementing LTE in unlicensed radio frequency spectrum, an LBT procedure (e.g., a CCA) should be performed before every change in transmission direction (e.g., downlink to uplink or uplink to downlink). By configuring a CCA of a duration that is short enough, the detection of energy in the CCA may be faster than detection of a signal, and therefore performing the short enough CCA may require less overhead than detecting a signal.

In some cases, to meet regulatory requirements and allow for an adaptive uplink/downlink boundary, a virtual CCA, as described above with reference to FIG. 13, may be implemented in devices implementing adaptive frame structure for wireless communications using unlicensed radio frequency spectrum. As described above, a virtual CCA generally refers to a CCA period that coincides with a transmission period when the device will not transmit a signal, even if the CCA indicates the channel is free (e.g., the device has no transmission permission). A device implementing adaptive frame structure for wireless communications using unlicensed radio frequency spectrum may be required to perform an LBT procedure (e.g., a CCA) at every change in transmission direction, and the device may be configured to perform an LBT procedure at every change in transmission direction.

Figure 14:
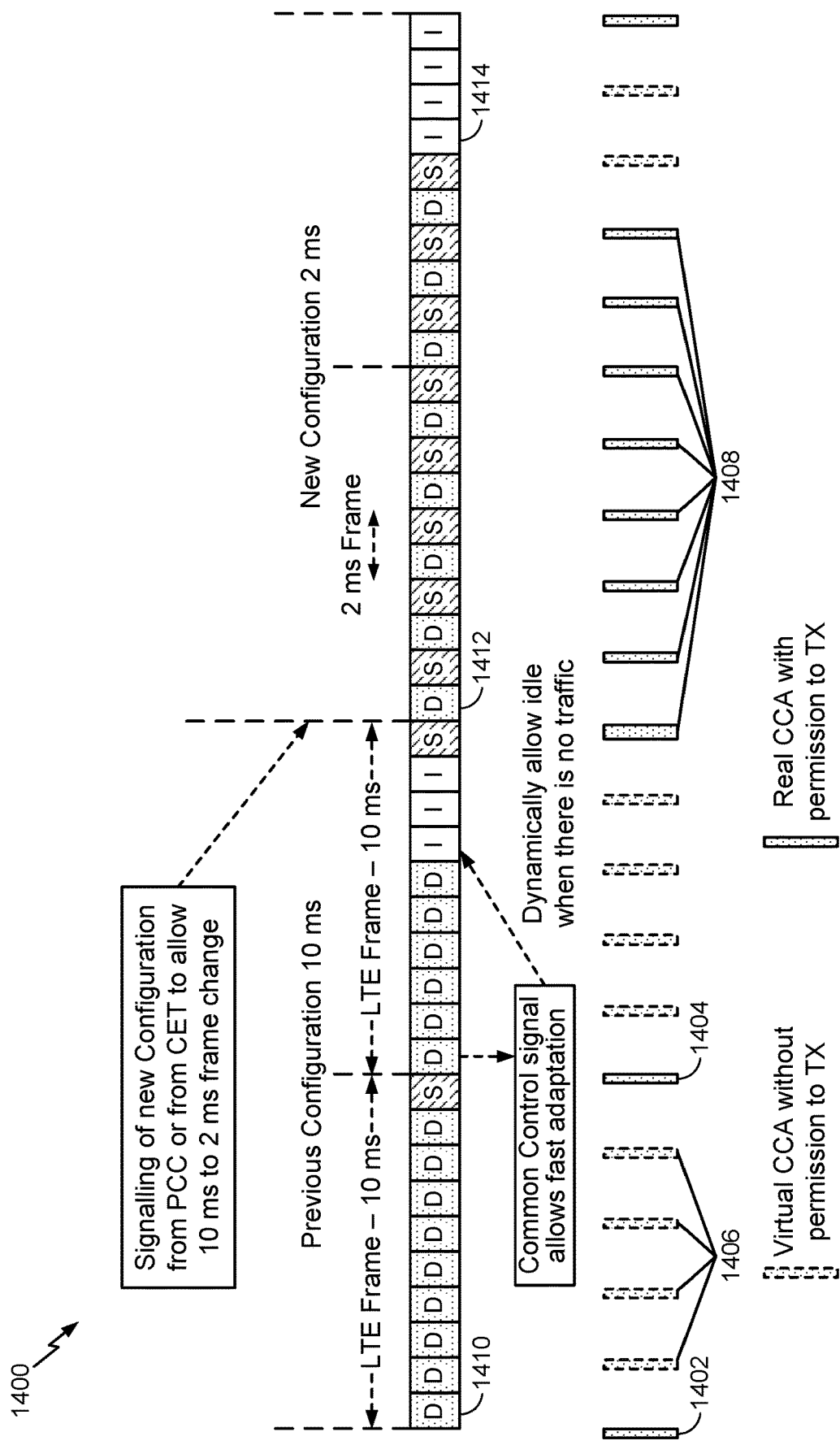
FIG. 14 illustrates an exemplary adaptive downlink frame structure utilizing real CCAs with permission to transmit and virtual CCAs without permission to transmit, in accordance with aspects of the present disclosure.

FIG. 14 illustrates an exemplary timeline 1400 including an adaptive downlink frame structure utilizing real CCAs with permission to transmit and virtual CCAs without permission to transmit in accordance with an aspect of the present disclosure. A combination of real CCAs and virtual CCAs may be used to comply with regulatory requirements and allow for adaptive changes in frame structures having different frame durations. A real CCA may be performed by a UE or BS which has permission to transmit (e.g., the UE or BS has performed a request to send and clear to send (RTS/CTS) signal exchange), and a virtual CCA may be performed when a UE does not have permission to transmit. In an aspect, a real CCA or virtual CCA may be performed after a time period equal to the shortest frame duration (a "CCA period") of the frame structures used to communicate between the UE and the base station. For example, in an aspect of communications between a UE and BS including a frame structure having a frame duration of 10 milliseconds (e.g., standard LTE frame structure) and an adaptive frame structure having a frame duration of 2 milliseconds, the CCA periodicity may be configured to 2 milliseconds (e.g., a real CCA or virtual CCA may be performed every 2 milliseconds). While frame duration is longer than the CCA period, as at 1410, a real CCA may be performed at the beginning of each frame, as illustrated at 1402 and 1404. Between frame beginnings, a virtual CCA 1406 may be performed every CCA period. When frame duration is adaptively changed to be equal to the CCA period, as at 1412, a real CCA 1408 may be performed at the beginning of each frame, and virtual CCAs may not be required until the frame duration is adaptively changed to be different from the CCA period.

Figure 15:
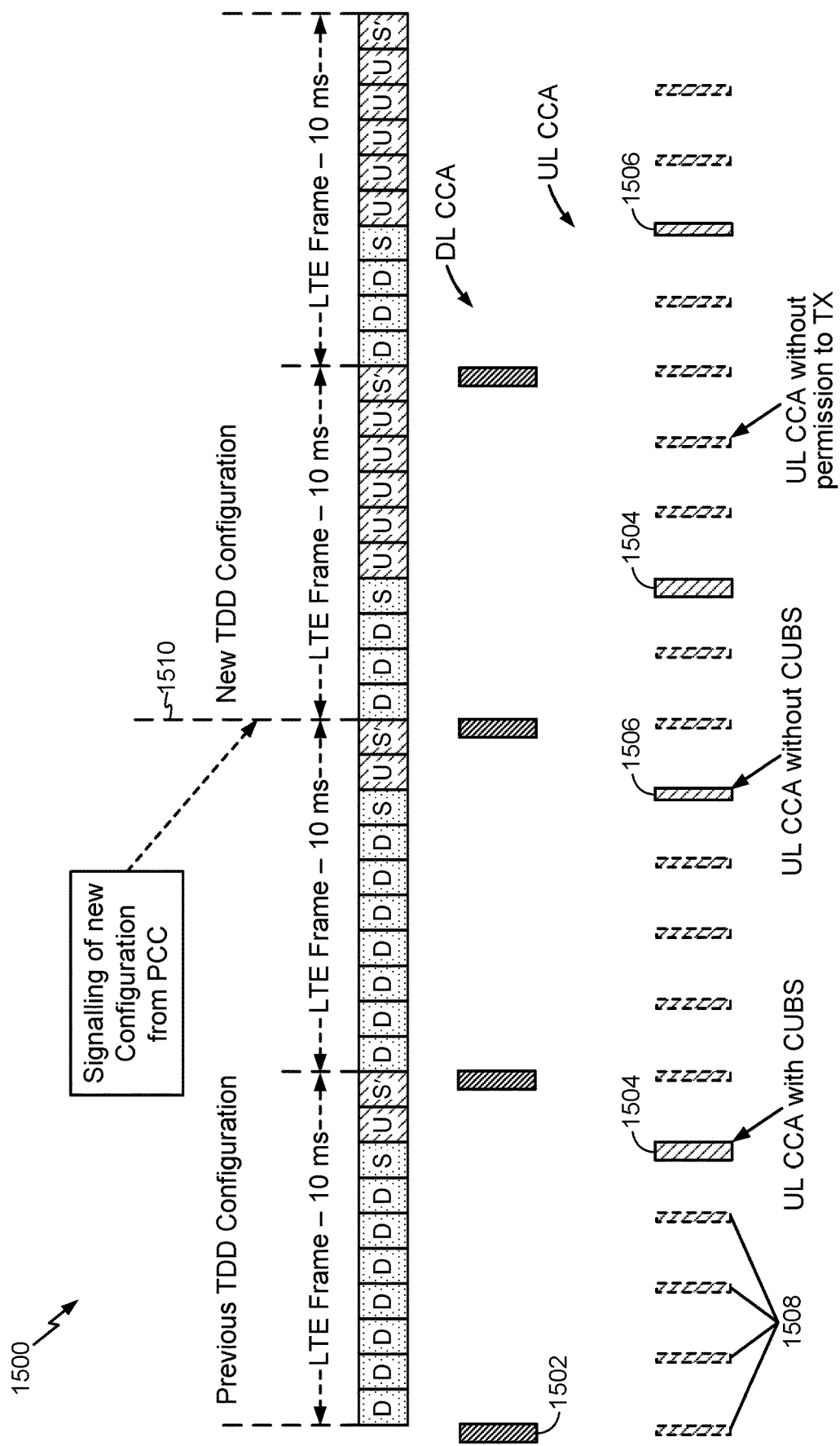
FIG. 15 illustrates an exemplary adaptive uplink frame structure having different uplink CCA periodicity and downlink CCA periodicity, in accordance with aspects of the present disclosure.

FIG. 15 illustrates an example timeline 1500 for transmissions in a cell implementing different CCA periodicities between an eNB and a UE within an adaptive frame structure, in accordance with aspects of the present disclosure. This timeline may be used with carrier aggregation or for standalone use of the unlicensed radio frequency spectrum. Because the eNB controls scheduling of the downlink data traffic and therefore has information regarding the adaptation of various frame structures ahead of time, CCA periodicity for the eNB may be determined by the eNB and may be more efficient than CCA periodicity for the UE. For example, on the downlink side, a CCA 1502 may be performed every 10 milliseconds (e.g., at the beginning of every LTE frame) to allow heavy downlink data traffic. On the uplink side, there may be three different types of uplink CCAs: CCAs with channel usage beacon signal (CUBS) 1504; CCAs without CUBS 1506; and virtual CCAs 1508 when the UE does not have permission to transmit data. In a CCA with CUBS, a device performs a CCA and transmits a signal on the channel as soon as the device determines that the channel is clear, so that other devices performing CCAs will hear the signal and determine that the device is going to transmit on the channel. The UE may adapt a CCA periodicity based at least in part on a channel transmission. For example, at 1510, the UE receives a transmission indicating a new TDD configuration for frames in the unlicensed radio frequency spectrum, and adapts a new CCA periodicity for CCAs with CUBS 1504.

Because the UE may not know the data traffic ahead of time, the UE may adapt a CCA periodicity that matches the shortest frame duration in order to enable transmission using the frame structure having the shortest frame duration. For example, the UE may adapt a CCA periodicity equal to the shortest frame duration of the plurality of frame structures used to communicate between the eNB and the UE.

Figure 16:
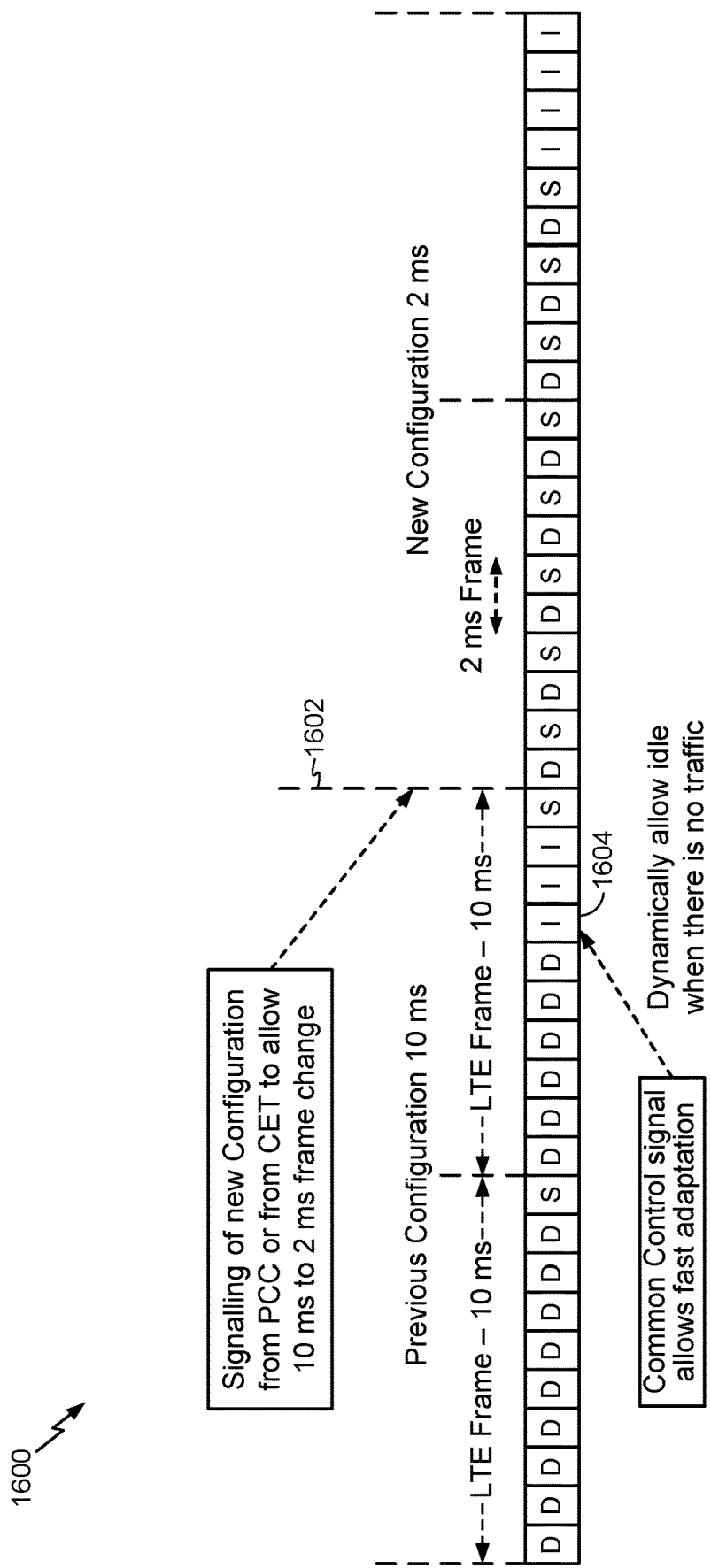
FIG. 16 illustrates an exemplary adaptive frame structure with various signaling indications of a frame structure change, in accordance with aspects of the present disclosure.

FIG. 16 illustrates an exemplary timeline 1600 for transmissions in a cell utilizing adaptive frame structure with various signals for indicating a frame structure change, in accordance with aspects of the present disclosure. In each CET, as at 1602, the preferred frame structure may be broadcast. A preferred uplink/downlink ratio or CCA priority may also be broadcast. In another aspect, a common control signal may be sent in the beginning of each frame, or before each frame, as at 1604, in order to indicate the frame structure of the frame. The common control signal may be a dynamic indication and may be multi-casted to all users associated with an operator. In a system using carrier aggregation, control signaling may be performed for all of the aggregated carriers on the PCC. For example, a cell may use carrier aggregation with a PCC in licensed radio frequency spectrum, an SCC in licensed radio frequency spectrum, and an SCC in unlicensed radio frequency spectrum. In the example, the cell may schedule transmissions on the PCC and both SCCs using control signaling transmitted on the PCC.

Figure 17:
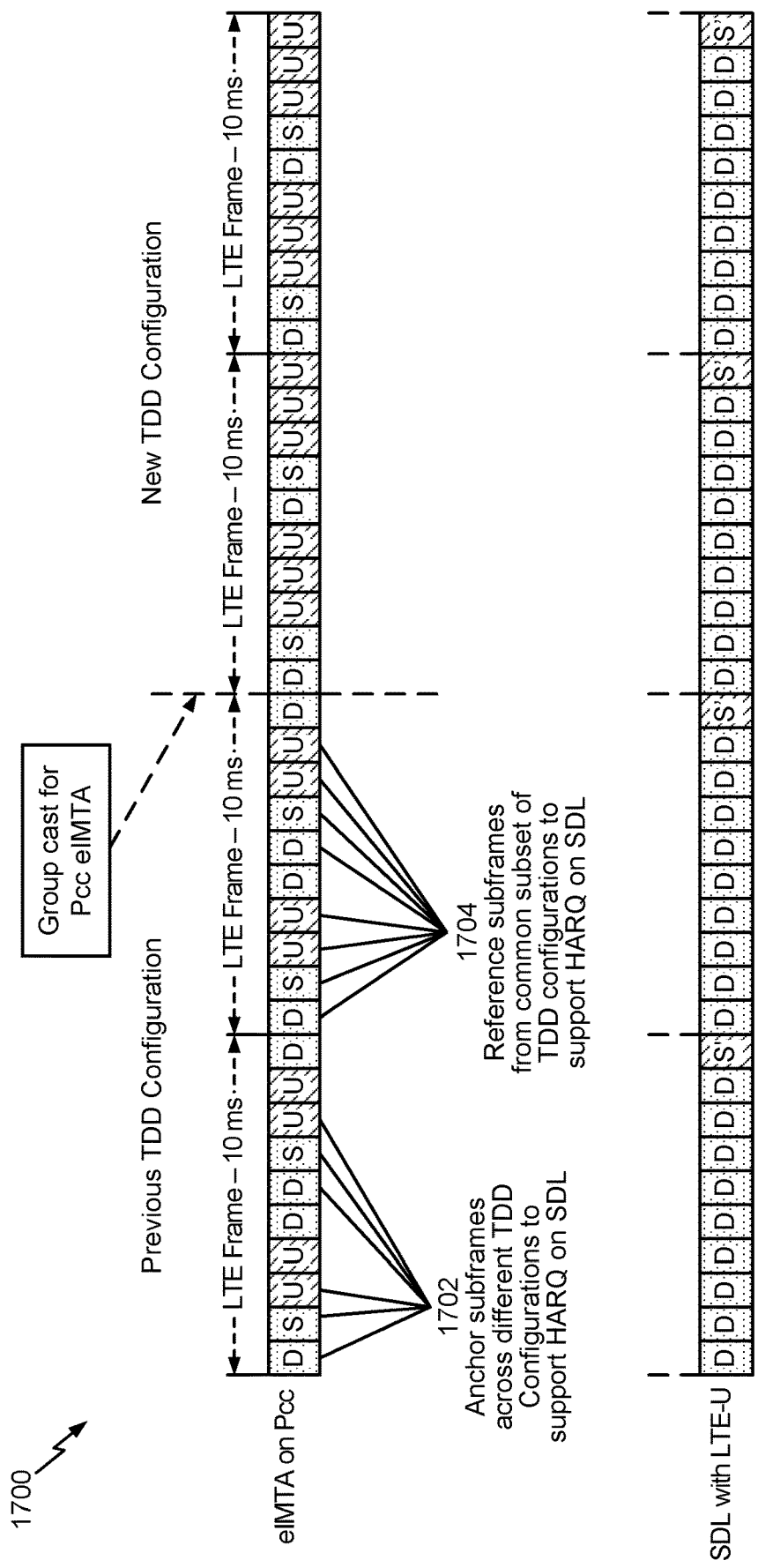
FIG. 17 illustrates exemplary anchor subframe and reference subframe configurations for LTE over unlicensed bandwidth, in accordance with aspects of the present disclosure.

FIG. 17 illustrates an exemplary timeline 1700 of transmissions for a cell utilizing TDD on a primary component carrier and an adaptive frame structure for wireless communications using unlicensed radio frequency spectrum on a secondary component carrier utilized as a secondary downlink (SDL), including anchor subframes 1702 and reference subframes 1704, in accordance with aspects of the present disclosure. Anchor subframes in different TDD configurations may support HARQ on the SDL. For example, a cell may configure an SDL using unlicensed radio frequency spectrum and perform eIMTA on a primary component carrier. In the example, the cell may receive HARQ ACK/NAKs, for transmissions on the SDL, in anchor subframes on the primary component carrier. Still in the example, the UEs may be configured to transmit all HARQ ACK/NAKs in the anchor subframes, so that the HARQ ACK/NAKs always encounter minimal interference. In another aspect, reference subframes from a common subset of TDD configurations (e.g., UL subframes from a reference subframe configuration) may support HARQ on an SDL.

According to certain aspects, a frame in a component carrier in unlicensed radio spectrum may be used entirely for downlink transmissions, or entirely for uplink transmissions. A BS may perform a downlink CCA at the beginning of a frame in order to determine if the component carrier is available for downlink transmissions during the frame. A BS may transmit a channel usage beacon signal (CUBS) upon successful completion of the CCA. Receipt of the CUBS by UEs and other BSs may cause CCAs performed by those UEs and BSs to indicate the channel is occupied.

According to certain aspects, base stations operated by different operators may use the same frame boundaries in the unlicensed radio frequency spectrum. By using the same frame boundaries, the BSs may be enabled to perform CCAs on the same time line. In addition, the BSs controlled by these operators may be enabled to use a frame for uplink or downlink in the same manner as neighboring BSs. This may reduce eNB-eNB, UE-UE, and eNB-UE interferences in the unlicensed radio frequency spectrum.

According to certain aspects, different operators may engage in a contention-based protocol to determine DL or UL direction for a frame to block other devices from transmitting in the opposite direction during the frame duration. CCA contention may be performed at the frame boundary for both UL and DL, as well as for different operators. According to these aspects, to resolve which operator may use a channel in the unlicensed shared spectrum, a contention process may be used. The contention process may assign priorities to different operators. The priorities assigned to different operators may cause the different operators to perform CCA at different times (e.g., a short time offset between the CCAs performed by the different operators). An operator having higher priority may start a CCA earlier than other operators having lower priority, and the operator performing the earlier CCA may seize the channel (e.g., by transmitting a CUBS) and prevent other transmissions from occurring during the frame duration. For example, operator A and operator B may each operate a BS in a cell using unlicensed radio frequency spectrum, with an agreement between operator A and operator B that they will use synchronized frame boundaries and that operator A has higher priority. In the example, operator A may use a CCA offset of thirty microseconds, while operator B may use a CCA offset of twenty microseconds. In the example, operator A's BS may schedule a transmission on the unlicensed radio frequency spectrum in a frame and begin a CCA thirty microseconds before the beginning of the frame. Still in the example, operator B's BS may also schedule a transmission on the unlicensed radio frequency spectrum in the frame and begin a CCA twenty microseconds before the beginning of the frame. In the example, the CCA of operator A's BS will complete before the CCA of operator B's BS, and operator A's BS can seize the channel (e.g., by transmitting a CUBS) to prevent operator B's BS from transmitting on the unlicensed radio frequency spectrum.

According to certain aspects, a contention process may include assigning a priority to a downlink CCA and an uplink CCA. For example, DL CCAs may be prioritized ahead of UL CCAs, so that a BS may perform a DL CCA and transmit a CUBS before a UE completes an UL CCA. In the example, the UE performing the UL CCA may receive the CUBS, which causes the UL CCA by the UE to indicate the channel is not clear.

According to certain aspects, the priority of DL and UL CCAs may be adjusted, which may allow an UL CCA to be completed before a DL CCA is completed. A UE completing an UL CCA may transmit a CUBS. Base stations performing DL CCAs may receive the CUBS, which may cause the DL CCA by the base stations to indicate the channel is not clear. For example, a core network entity may determine that network congestion has caused a backlog of UL data to accumulate at UEs served by a BS. In the example, the core network may cause the BS to transmit a control signal changing the priority of DL CCAs and UL CCAs, such that UL CCAs have a higher priority. Still in the example, UEs with data to transmit may complete UL CCAs and transmit a CUBS before entities performing DL CCAs (e.g., femto nodes and relay nodes), and the UEs may be able to perform UL transmissions in unlicensed radio frequency spectrum to help clear the UEs' backlog of data to be transmitted.

According to certain aspects, CCA opportunities for operators are shared among the operators on the DL with fixed subframe boundaries. According to these aspects, a UE may perform an inter-operator CCA, and if the inter-operator CCA succeeds, the UE may perform an intra-operator CCA. That is, a UE may perform an inter-operator CCA to determine that no other operators will be using the channel, and then perform an intra-operator CCA to determine that UEs and BSs associated with the UE's operator will not be using the channel. According to another aspect, the UL CCA boundary can be different across operators, but dependent on the DL CCA, in that if a DL CCA succeeds, an UL CCA from the same operator may be allowed. However, if a DL CCA fails, then an UL CCA may not be allowed.

According to certain aspects, adaptive frame structures for wireless communications using unlicensed radio frequency spectrum may be implemented with FDD implemented on licensed radio frequency spectrum and an SDL on unlicensed radio frequency spectrum. Such an implementation may have a variable downlink transmission length. Dynamic changes of CCA frame structure and DL transmission duration may be used for traffic adaptation, interference reduction, and radar detection.

According to certain aspects, adaptive frame structures for wireless communications using unlicensed radio frequency spectrum may be implemented with TDD implemented on a licensed radio frequency spectrum with eIMTA and an SDL on unlicensed radio frequency spectrum. In an aspect, a reference configuration for unlicensed radio frequency spectrum SDL signaling may be defined and signaled. A reference configuration is a subframe configuration that is used by UEs in a cell in all frames, while the BS of the cell may switch to other subframe configurations that may be similar to the reference configuration. Regardless of the PCC's actual eIMTA configuration, the reference configuration may be followed for operations of the unlicensed radio frequency spectrum SDL. The reference configuration may be updated and signaled to UEs through broadcast, group cast, or unicast signaling. Use of an SDL may allow reductions in the need for DL heavy reconfiguration, and this may be considered in reference configuration selection. According to certain aspects, an eNB may select UL heavy TDD configurations for the PCC, as unlicensed radio frequency spectrum provides the SDL. The reference configuration may be a configuration of a subset of subframes in a frame, wherein the subframes' directions are common to all TDD configurations the BS may select.

In another aspect, anchor subframes of the eIMTA configuration may be used for unlicensed radio frequency spectrum SDL signaling. Anchor subframes may provide guaranteed signaling and may be available regardless of the selected eIMTA configuration. An SDL may not be directly impacted by the dynamic adaptation of the licensed carrier. An eNB may also use anchor subframes to support HARQ for SDL with a reduction in efficiency when compared to the technique of using reference subframes to support HARQ on SDL, described above.

According to certain aspects, adaptive frame structures for wireless communications using unlicensed radio frequency spectrum may be implemented with carrier aggregation. In these aspects, the PCC may be in licensed radio frequency spectrum, while the unlicensed radio frequency spectrum provides one or more SCCs. In an aspect, signaling of the desired configuration of the adaptive frame structure for use in the unlicensed radio frequency spectrum may be performed in an SCC in CET signals, which may be transmitted once each 80 milliseconds. According to another aspect, signaling of the desired configuration may be performed from the PCC, which may allow for adaptation in less than 80 milliseconds.

In aspects, adaptive frame structures for wireless communications using unlicensed radio frequency spectrum may be implemented with carrier aggregation, with FDD implemented on licensed radio frequency spectrum and TDD with eIMTA implemented on unlicensed radio frequency spectrum. In an aspect, two different CCA periods may be implemented for downlink transmissions and uplink transmissions on the unlicensed radio frequency spectrum operating with eIMTA. Downlink may use a longer CCA period for efficiency (e.g., a longer CCA period means that fewer CCAs are performed), while uplink may use a shorter CCA period to allow for fast adaptation in both directions (e.g., CCAs are used when switching directions). In each eIMTA adaptation period, the DL/UL CCA reconfiguration may be applied. In an example design, opportunities for downlink CCAs and uplink CCAs occur with a period of 2 milliseconds, but some DL CCAs and UL CCAs are not performed because the corresponding DL and UL transmissions are lower priority or not allowed.

According to aspects of the present disclosure, eIMTA configuration in an area (e.g., a cell or a larger region) in the unlicensed radio frequency spectrum may be performed per operator, and each operator may independently determine the eIMTA configuration that operator will use.

In an aspect, when UL and DL CCAs collide, a new configuration may be signaled from a PCC in order to determine the transmission direction. For example, UEs in an area may attempt an UL CCA while eNBs in the same area are attempting a DL CCA, and the UL CCA and DL CCAs may collide, such that neither UL nor DL transmissions occur. In the example, the eNBs may transmit a new configuration using a signal on a PCC to determine the transmission direction to be used in the area.

According to an aspect, a downlink/uplink traffic ratio for each eIMTA adaptation period may be signaled. According to this aspect, a mapping of ratios to CCA configuration rules may be defined. In each eIMTA adaptation period, the DL/UL CCA reconfiguration may be applied. eIMTA configuration may be performed per operator, and each operator may independently determine the eIMTA configuration that operator will implement. In an example design, downlinks and uplinks may follow a 2 millisecond frame structure for LBT procedures (e.g., CCA). Signaling of a new configuration from a PCC to determine transmission direction may be used when CCA opportunities collide, as described above.

According to aspects of the present disclosure, TDD may be implemented in a component carrier (CC) on licensed radio frequency spectrum and in a component carrier on unlicensed radio frequency spectrum. One or both of the TDD component carriers may implement eIMTA. In an aspect utilizing eIMTA in a component carrier on licensed radio frequency spectrum, subframes of a reference configuration or anchor subframes may be used for HARQ and control signaling of the unlicensed radio frequency spectrum TDD CC. In an aspect utilizing eIMTA in a component carrier on unlicensed radio frequency spectrum, the TDD CC in the licensed radio frequency spectrum may be used to handle HARQ for the unlicensed radio frequency spectrum eIMTA CC. In an aspect utilizing eIMTA on both the licensed and unlicensed radio frequency spectrum component carriers, both the licensed radio frequency spectrum TDD CC and unlicensed radio frequency spectrum TDD CCs may have the same configuration.

According to aspects of the present disclosure, adaptive frame structures for wireless communications using unlicensed radio frequency spectrum may also be implemented in standalone (SA) unlicensed radio frequency spectrum scenarios. An example SA scenario may entail an SA carrier with eIMTA in unlicensed radio frequency spectrum. An example SA design may be similar to CA designs as discussed above, except that signaling of an eIMTA DL/UL ratio or CCA priority on CCA exempt transmission (CET) channels may be performed once each 80 milliseconds. In the example SA design, UEs may monitor the CET to adjust DL/UL ratios and/or CCA priority. Downlink/uplink CCA priority may be adjusted based on, for example, allowed or disallowed transmissions. That is, a BS may transmit a signal in a CET period to raise the priority of UL transmissions when a disproportionate number of UL transmissions were disallowed in a recent time period (e.g., due to CCAs indicating the channel was occupied), or raise the priority of DL transmissions when a disproportionate number of DL transmissions were disallowed in a recent time period.

Figure 18:
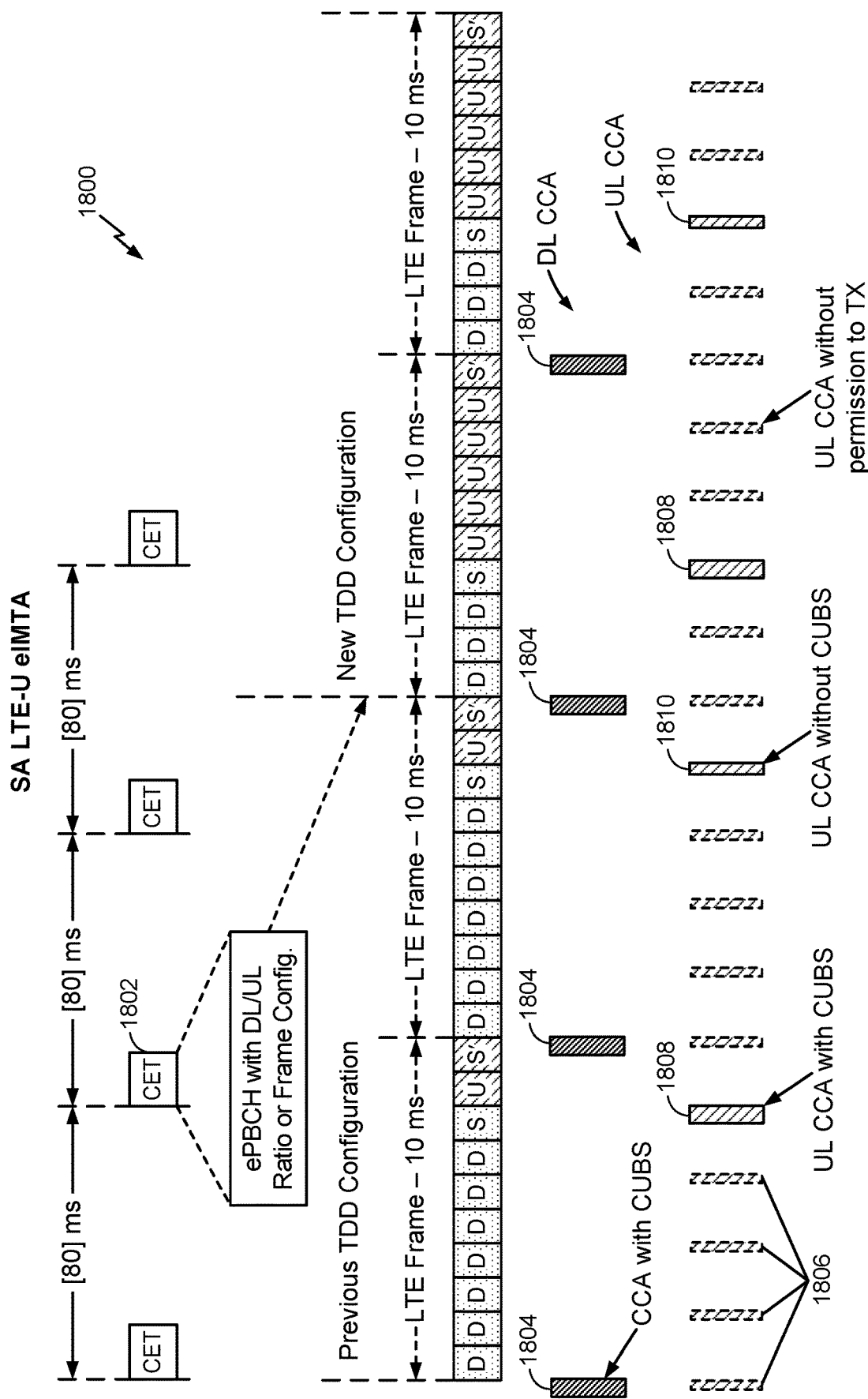
FIG. 18 illustrates an exemplary configuration for stand-alone (SA) LTE over unlicensed radio frequency spectrum, in accordance with aspects of the present disclosure.

FIG. 18 illustrates an example timeline 1800 for transmissions in a cell utilizing adaptive frame structure for wireless communications using unlicensed radio frequency spectrum implemented on standalone unlicensed radio frequency spectrum with no component carriers in licensed radio frequency spectrum. In the example timeline, a BS transmits an evolved physical broadcast channel (EPBCH) during a CCA exempt transmission (CET) period 1802 signaling a selected frame structure for one or more component carriers in the unlicensed radio frequency spectrum. As illustrated, CETs may occur once per 80 milliseconds. In an aspect, a BS may use a CCA period of 10 subframes, while a UE may use a CCA period of 2 subframes where the periodicity of real CCAs by UEs (e.g., UL CCAs) may vary depending on, for example, data traffic. That is, similar to other aspects, a BS may perform a DL CCA 1804 every 10 subframes, while a UE may perform an UL CCA every 2 subframes. The UL CCAs may comprise UL virtual CCAs 1806, UL CCAs with CUBS 1808, and UL CCAs without CUBS 1810. Periodicity of each type of UL CCA may vary depending on, for example, transmission permission, and the UE performs the CCAs (e.g., a virtual CCA, a CCA with CUBS, or a CCA without CUBS) according to its configured CCA periodicity.

Figure 19:
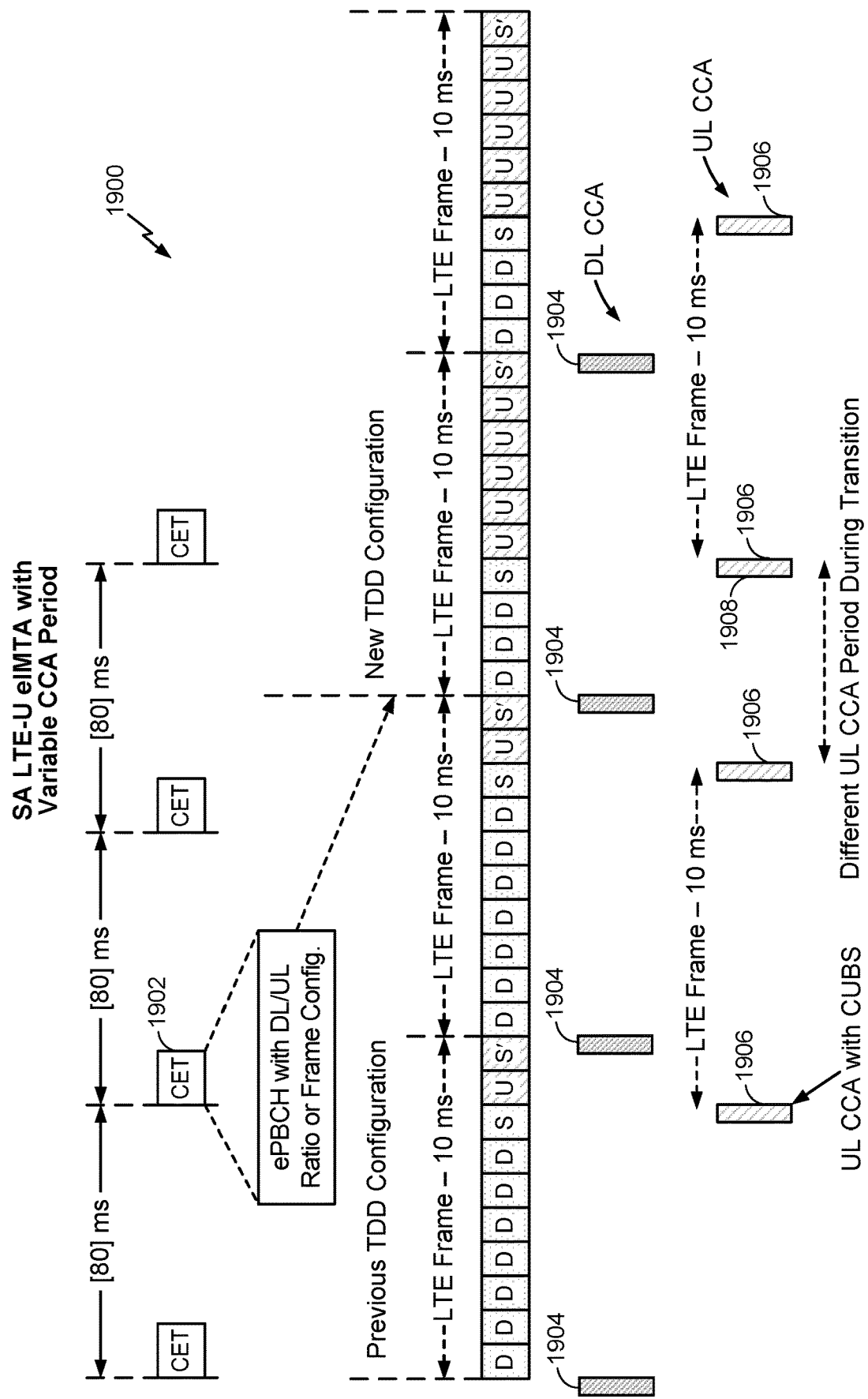
FIG. 19 illustrates an exemplary configuration for stand-alone (SA) LTE over unlicensed radio frequency spectrum with a variable CCA periodicity, in accordance with aspects of the present disclosure.

FIG. 19 illustrates an example timeline 1900 for transmissions in a cell utilizing adaptive frame structure for wireless communications implemented on standalone unlicensed radio frequency spectrum with eIMTA and a variable CCA period, in accordance with aspects of the present disclosure. In the example timeline, a BS transmits an evolved physical broadcast channel (EPBCH) during a CCA exempt transmission (CET) period 1902 signaling a DL/UL subframe ratio or a selected frame structure for one or more component carriers in the unlicensed radio frequency spectrum. As illustrated, CETs may occur once per 80 milliseconds. As described above with respect to FIG. 18, a BS may perform a DL CCA 1904 every 10 subframes. In an aspect, the UE CCA periodicity may not be fixed, as discussed above, and may be varied. For example, a UE may determine when to perform an uplink operation (e.g., based on scheduled transmissions by the UE) and may vary the UE's CCA periodicity accordingly. In the exemplary timeline 1900, the UE is scheduled to transmit an UL transmission in the first UL subframe of each frame, and therefore uses a CCA periodicity equal to the frame duration, transmitting an UL CCA with CUBS 1906 once each 10 ms. Also, the UE may adjust the CCA periodicity during transitions from one frame configuration to a different frame configuration, as illustrated at 1908. A UE may also adjust the UE's uplink CCA period during a transition from one TDD configuration to another.

Figure 20:
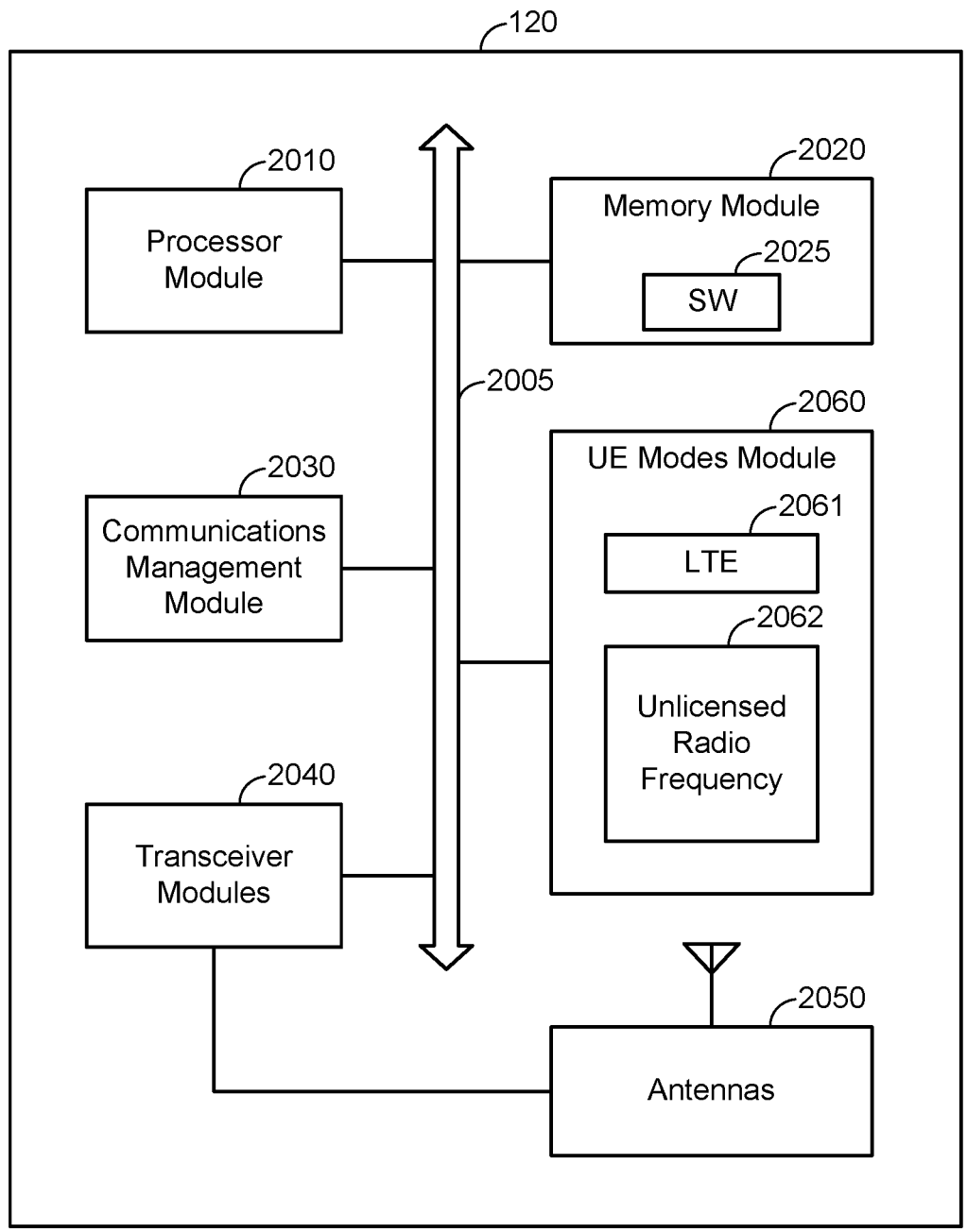
FIG. 20 illustrates a block diagram that illustrates an example of a UE architecture according to various embodiments.

FIG. 20 illustrates an example of a UE 120 configured for adaptive frame structure for wireless communications using unlicensed radio frequency spectrum. The UE 120 may have various other configurations and may be included in or be part of a personal computer (e.g., laptop computer, netbook computer, tablet computer, etc.), a cellular telephone, a PDA, a digital video recorder (DVR), an internet appliance, a gaming console, an e-reader, etc. The UE 120 may have an internal power supply (not shown), such as a small battery, to facilitate mobile operation. The UE 120 may be configured to implement at least some of the features and functions described above with respect to FIGS. 1-19. For example, UE 120 may be capable of performing operations set forth in FIGS. 10 and 13.

The UE 120 may include a processor module 2010, a memory module 2020, a transceiver module 2040, antennas 2050, and a UE modes module 2060. Each of these components may be in communication with each other, directly or indirectly, over one or more buses 2005.

The memory module 2020 may include random access memory (RAM) and read-only memory (ROM). The memory module 2020 may store computer-readable, computer-executable software (SW) code 2025 containing instructions that are configured to, when executed, cause the processor module 2010 to perform various functions described herein for using LTE-based communications in an unlicensed channel. Alternatively, the software code 2025 may not be directly executable by the processor module 2010 but may be configured to cause the computer (e.g., when compiled and executed) to perform functions described herein.

The processor module 2010 may include an intelligent hardware device, e.g., a central processing unit (CPU), a microcontroller, an application-specific integrated circuit (ASIC), etc. The processor module 2010 may process information received through the transceiver module 2040 and/or to be sent to the transceiver module 2040 for transmission through the antennas 2050. The processor module 2010 may handle, alone or in connection with the UE modes module 2060, various aspects of using LTE-based communications in an unlicensed channel.

The transceiver module 2040 may be configured to communicate bi-directionally with base stations (e.g., base stations 110). The transceiver module 2040 may be implemented as one or more transmitter modules and one or more separate receiver modules. The transceiver module 2040 may support communications in a licensed radio frequency spectrum and in an unlicensed radio frequency spectrum. The transceiver module 2040 may include a modem configured to modulate the packets and provide the modulated packets to the antennas 2050 for transmission, and to demodulate packets received from the antennas 2050. While the UE 120 may include a single antenna, there may be embodiments in which the UE 120 includes multiple antennas 2050.

According to the architecture of FIG. 20, the UE 120 may further include a communications management module 2030. The communications management module 2030 may manage communications with various access points. The communications management module 2030 may be a component of the UE 120 in communication with some or all of the other components of the UE 120 over the one or more buses 2005. Alternatively, functionality of the communications management module 2030 may be implemented as a component of the transceiver module 2040, as a computer program product, and/or as one or more controller elements of the processor module 2010.

The UE modes module 2060 may be configured to perform and/or control some or all of the functions or aspects described in relation to FIG. 13 and related to using LTE-based communications in an unlicensed channel. For example, the UE modes module 2060 may be configured to support a supplemental downlink mode, a carrier aggregation mode, and/or a standalone mode. The UE modes module 2060 may include an LTE module 2061 configured to handle LTE communications in licensed radio frequency spectrum and an unlicensed radio frequency module 2062 configured to handle LTE communications and communications other than LTE in unlicensed radio frequency spectrum. The UE modes module 2060, or portions of it, may be a processor. Moreover, some or all of the functionality of the UE modes module 2060 may be performed by the processor module 2010 and/or in connection with the processor module 2010.

Figure 21:
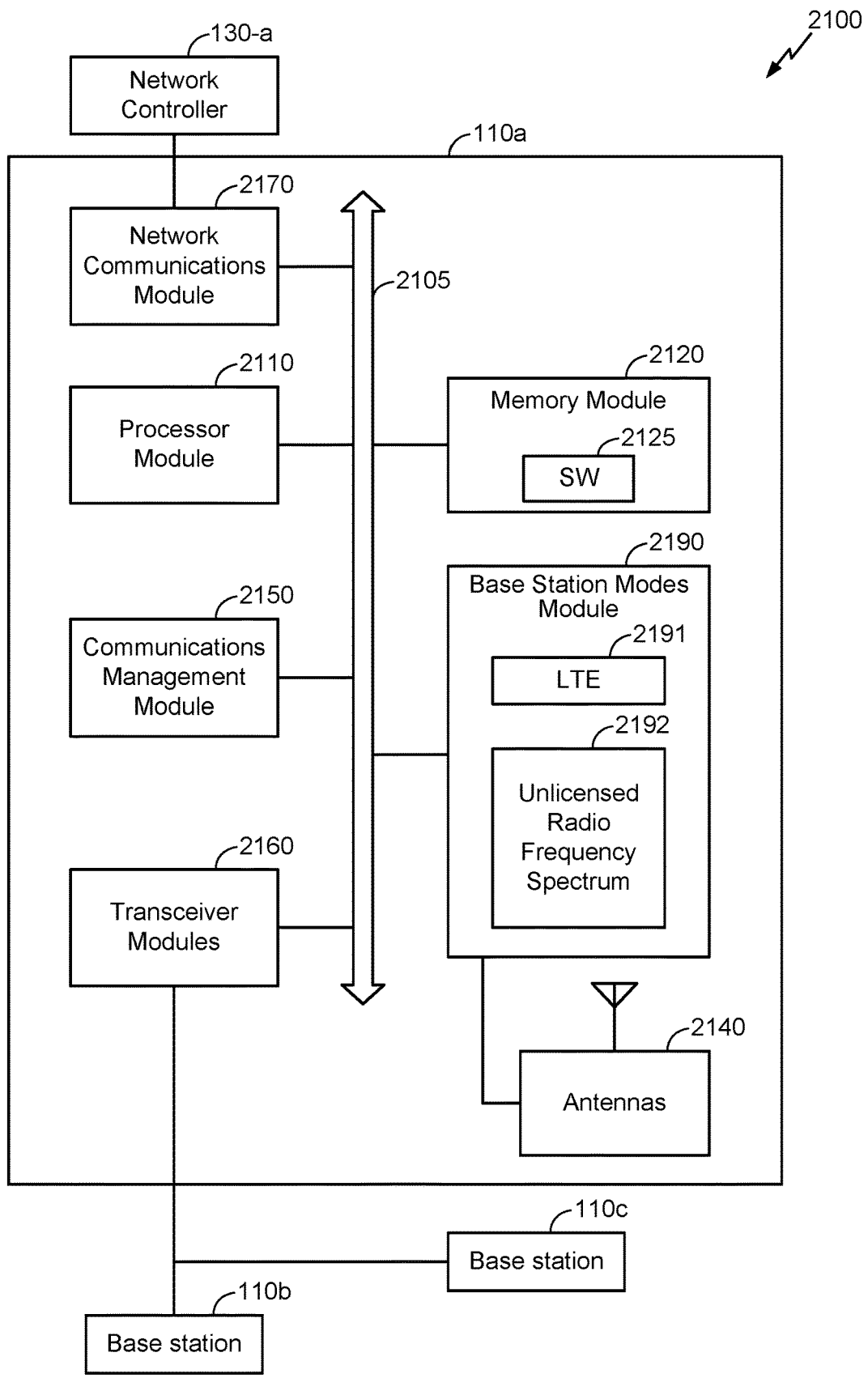
FIG. 21 illustrates a block diagram that illustrates an example of a base station architecture according to various embodiments.

Turning to FIG. 21, a diagram 2100 is shown that illustrates a base station or eNB 110*a* configured for adaptive frame structure for wireless communications using unlicensed radio frequency spectrum. The eNodeB 110*a* may be configured to implement at least some of the features and functions described above with respect to FIGS. 1-19. For example, eNodeB 110*a* may be capable of performing operations shown in FIGS. 10-11. The eNodeB 110*a* may include a processor module 2110, a memory module 2120, a transceiver module 2130, antennas 2140, and a base station modes module 2190. The base stations 110 may also include one or both of a base station communications module 2160 and a network communications module 2170. Each of these components may be in communication with each other, directly or indirectly, over one or more buses 2105.

The memory module 2120 may include RAM and ROM. The memory module 2120 may also store computer-readable, computer-executable software (SW) code 2125 containing instructions that are configured to, when executed, cause the processor module 2110 to perform various functions described herein for using LTE-based communications in an unlicensed channel. Alternatively, the software code 2125 may not be directly executable by the processor module 2110 but may be configured to cause the computer, e.g., when compiled and executed, to perform functions described herein.

The processor module 2110 may include an intelligent hardware device, e.g., a CPU, a microcontroller, an ASIC, etc. The processor module 2110 may process information received through the transceiver module 2130, the base station communications module 2160, and/or the network communications module 2170. The processor module 2110 may also process information to be sent to the transceiver module 2130 for transmission through the antennas 2140, to the base station communications module 2160, and/or to the network communications module 2170. The processor module 2110 may handle, alone or in connection with the base station modes module 2190, various aspects of using LTE-based communications in an unlicensed channel.

The transceiver module 2130 may include a modem configured to modulate the packets and provide the modulated packets to the antennas 2140 for transmission, and to demodulate packets received from the antennas 2140. The transceiver module 2130 may be implemented as one or more transmitter modules and one or more separate receiver modules. The transceiver module 2130 may support communications in a licensed radio frequency spectrum and in an unlicensed radio frequency spectrum. The transceiver module 2130 may be configured to communicate bi-directionally, via the antennas 2140, with one or more UEs 120.

The eNodeB 110*a* may typically include multiple antennas 2140 (e.g., an antenna array). The eNodeB 110*a* may communicate with a network controller 130-*a* through the network communications module 2170. The eNodeB 110*a* may communicate with other base stations, such as the eNodeB 110*b* and the eNodeB 110*c*, using the base station communications module 2160.

According to the architecture of FIG. 21, the eNodeB 110*a* may further include a communications management module 2150. The communications management module 2150 may manage communications with stations and/or other devices. The communications management module 2150 may be in communication with some or all of the other components of the eNodeB 110*a* via the bus or buses 2105. Alternatively, functionality of the communications management module 2150 may be implemented as a component of the transceiver module 2130, as a computer program product, and/or as one or more controller elements of the processor module 2110.

The base station modes module 2190 may be configured to perform and/or control some or all of the functions or aspects described in FIGS. 10-11 related to using LTE-based communications in an unlicensed channel. For example, the base station modes module 2190 may be configured to support a supplemental downlink mode, a carrier aggregation mode, and/or a standalone mode. The base station modes module 2190 may include an LTE module 2191 configured to handle LTE communications in licensed radio frequency spectrum and an unlicensed radio frequency spectrum module 2192 configured to handle LTE communications in unlicensed radio frequency spectrum. The base station modes module 2190, or portions of it, may be a processor. Moreover, some or all of the functionality of the base station modes module 2190 may be performed by the processor module 2110 and/or in connection with the processor module 2110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, the expression "at least one of a or b" is meant to include a, b, or the combination of both a and b.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications performed by a base station, comprising:
   transmitting, during a subframe, a control signal including:
      a subframe configuration field to a user equipment (UE), the subframe configuration field indicates a configuration of transmission resources used for communication with an unlicensed radio frequency spectrum cell served by the base station, wherein the transmission resources comprise uplink (UL) resources; and
      an indication that the UE is permitted to transmit the UL resources in the same subframe as the control signal; and
   communicating with the UE via the unlicensed radio frequency spectrum cell during the subframe according to the configuration of the transmission resources, wherein the communicating with the UE comprises receiving a signal from the UE.

2. The method of claim 1, wherein the control signal comprises a common control signal.

3. The method of claim 1, further comprising:
   communicating with the UE during a next subframe after the subframe according to the configuration of the transmission resources.

4. The method of claim 1, wherein the transmission resources further comprise downlink (DL) resources.

5. A method for wireless communications performed by a user equipment (UE), comprising:
   receiving, during a subframe, a control signal including:
      a subframe configuration field from an unlicensed radio frequency spectrum cell, the subframe configuration field indicates a configuration of transmission resources used for communication with the unlicensed radio frequency spectrum cell, wherein the transmission resources comprise uplink (UL) resources; and
      an indication that the UE is permitted to transmit the UL resources in the same subframe as the control signal; and
   communicating with the unlicensed radio frequency spectrum cell during the subframe according to the configuration of transmission resources, wherein communicating with the unlicensed radio frequency spectrum cell comprises transmitting a signal to the unlicensed radio frequency spectrum cell.

6. The method of claim 5, wherein the control signal comprises a common control signal.

7. The method of claim 5, further comprising:
   communicating with the unlicensed radio frequency spectrum cell during a next subframe after the subframe according to the configuration of the transmission resources.

8. The method of claim 5, wherein the transmission resources further comprise downlink (DL) resources.

9. An apparatus for wireless communications, comprising:
   a processor configured to:
      cause the apparatus to transmit, during a subframe, a control signal including:
         a subframe configuration field to a user equipment (UE), the subframe configuration field indicates a configuration of transmission resources used for communication with an unlicensed radio frequency spectrum cell served by the base station, wherein the transmission resources comprise uplink (UL) resources; and an indication that the UE is permitted to transmit the UL resources in the same subframe as the control signal; and cause the apparatus to communicate with the UE via the unlicensed radio frequency spectrum cell during the subframe according to the configuration of the transmission resources, wherein communicating with the UE comprises receiving a signal from the UE; and a memory coupled to the processor.

10. The apparatus of claim 9, wherein the processor is configured to cause the apparatus to transmit the control signal by causing the apparatus to transmit a common control signal.

11. The apparatus of claim 9, wherein the processor is configured to:

cause the apparatus to communicate with the UE during a next subframe after the subframe according to the configuration of the transmission resources.

12. The apparatus of claim 9, wherein the transmission resources comprise downlink (DL) resources and the processor is configured to cause the apparatus to communicate with the UE by causing the apparatus to transmit a signal to the UE.

13. An apparatus for wireless communications, comprising:

a processor configured to:

cause the apparatus to receive, during a subframe, a control signal including:

a subframe configuration field from an unlicensed radio frequency spectrum cell, the subframe configuration field indicates a configuration of transmission resources used for communication with the unlicensed radio frequency spectrum cell, wherein the transmission resources comprise uplink (UL) resources; and an indication that the UE is permitted to transmit the UL resources in the same subframe as the control signal; and cause the apparatus to communicate with the unlicensed radio frequency spectrum cell during the subframe according to the configuration of transmission resources, wherein communicating with the unlicensed radio frequency spectrum cell comprises transmitting a signal to the unlicensed radio frequency spectrum cell; and a memory coupled to the processor.

14. The apparatus of claim 13, wherein the processor is configured to cause the apparatus to receive the control signal by causing the apparatus to receive a common control signal.

15. The apparatus of claim 13, wherein the processor is configured to:

cause the apparatus to communicate with the unlicensed radio frequency spectrum cell by during a next subframe after the subframe according to the configuration of the transmission resources.

16. The apparatus of claim 13, wherein the transmission resources further comprise downlink (DL) resources.

* * * * *